(12) United States Patent
Stellabuto

(10) Patent No.: US 10,654,649 B2
(45) Date of Patent: May 19, 2020

(54) ROOF TOP UNIT TRANSPORT AND LIFT DEVICE AND SYSTEM, AND METHODS OF USE THEREOF

(71) Applicant: Anthony T. Stellabuto, Laurel, MD (US)

(72) Inventor: Anthony T. Stellabuto, Laurel, MD (US)

(73) Assignee: ATS MECHANICAL SERVICES, INC., Laurel, MD (US)

( * ) Notice: Subject to any disclaimer, the term of this patent is extended or adjusted under 35 U.S.C. 154(b) by 0 days.

(21) Appl. No.: 15/610,017

(22) Filed: May 31, 2017

(65) Prior Publication Data

US 2018/0251304 A1    Sep. 6, 2018

Related U.S. Application Data

(60) Provisional application No. 62/465,625, filed on Mar. 1, 2017.

(51) Int. Cl.
*B62D 21/14* (2006.01)
*B65G 7/04* (2006.01)
*B62B 5/00* (2006.01)

(52) U.S. Cl.
CPC .............. *B65G 7/04* (2013.01); *B62B 5/0086* (2013.01); *B62B 5/0089* (2013.01); *B62B 2202/10* (2013.01); *B62B 2206/06* (2013.01)

(58) Field of Classification Search
CPC .... B65G 7/04; B65G 7/00; B65G 7/02; B62B 1/00; B62B 1/04; B62B 1/06; B62B 1/10; B62B 1/12; B62B 1/14; B62B 1/125; B62B 1/142; B62B 1/26; B62B 3/00; B62B 3/02; B62B 3/04; B62B 3/06; B62B 3/007; B62B 3/10; B62B 3/12; B62B 3/0606; B62B 3/0618; B62B 3/0643; B62B 5/0089; B62B 5/0086; B62B 5/0083

See application file for complete search history.

(56) References Cited

U.S. PATENT DOCUMENTS

| | | | | |
|---|---|---|---|---|
| 530,437 A | * | 12/1894 | Mason ................... | B62B 5/0083 280/35 |
| 4,302,023 A | * | 11/1981 | Kiesz ....................... | B62B 3/02 108/106 |
| 4,452,555 A | * | 6/1984 | Calabro ................ | B60P 1/6445 280/43.23 |

(Continued)

*Primary Examiner* — James M Dolak
(74) *Attorney, Agent, or Firm* — Arent Fox LLP

(57) ABSTRACT

A device or system for transporting an object to be transported, such as a heavy roof mountable HVAC unit, via inexpensive mechanical lift features that may be easily assembled onto system components that include mobile features, such as wheels. The device and system may include three or more wheeled attachment features that are selectively attachable to the object to the transported. Each wheeled attachment feature may include a selectively variable height mechanism, such as a jack; a securing mechanism for securing each wheeled attachment feature to the object to be transported, the securing mechanism including, for example, a mounting plate and a securing tab for holding the wheeled attachment feature to the object; and a wheel coupled, for example, via an upright inner sleeve, to the variable height mechanism.

10 Claims, 32 Drawing Sheets

(56) References Cited

U.S. PATENT DOCUMENTS

| | | | | |
|---|---|---|---|---|
| 4,491,452 | A * | 1/1985 | Matovich | B60B 29/002 254/4 R |
| 4,611,816 | A * | 9/1986 | Traister | B65D 90/143 280/43.2 |
| 5,660,518 | A * | 8/1997 | Meier | B62B 5/0083 180/41 |
| 5,716,186 | A * | 2/1998 | Jensen | A47F 5/108 187/244 |
| 5,791,856 | A * | 8/1998 | Kosonen | B65D 90/143 414/458 |
| 5,927,731 | A * | 7/1999 | Clarke | E04F 21/0023 280/47.24 |
| 6,171,048 | B1 * | 1/2001 | Grimes | B62B 3/02 414/427 |
| 6,431,805 | B2 * | 8/2002 | Lanciaux, Jr. | B65D 90/146 414/12 |
| 6,634,658 | B2 * | 10/2003 | Larouche | B62B 5/0083 280/47.17 |
| 7,328,907 | B1 * | 2/2008 | Bileth | A47F 5/137 280/79.11 |
| 7,438,301 | B2 * | 10/2008 | Schilling | A47F 5/108 280/47.15 |
| 7,784,802 | B2 * | 8/2010 | White | B62B 3/02 280/47.41 |
| 8,662,252 | B2 * | 3/2014 | Ogden | E04G 1/02 182/107 |
| 9,694,936 | B2 * | 7/2017 | DeBattiste | B66F 3/46 |
| 10,144,625 | B2 * | 12/2018 | Giattina | B66F 3/46 |
| 10,179,701 | B2 * | 1/2019 | Hu | B62B 1/14 |
| 10,214,904 | B2 * | 2/2019 | Callahan | E04C 3/08 |
| 10,232,761 | B2 * | 3/2019 | Hooper | B60P 3/1075 |
| 10,266,194 | B2 * | 4/2019 | Allos | B62B 3/008 |
| 10,272,935 | B1 * | 4/2019 | Jordan | B62B 1/008 |
| 2003/0091417 | A1 * | 5/2003 | Swann | B62B 5/0083 414/458 |
| 2009/0020369 | A1 * | 1/2009 | Warachka | B66F 9/07522 187/231 |
| 2011/0048036 | A1 * | 3/2011 | Smith | F24F 13/20 62/77 |
| 2012/0006605 | A1 * | 1/2012 | Warachka | B66F 9/07522 180/65.6 |
| 2014/0314531 | A1 * | 10/2014 | Hearld | B62B 5/0093 414/495 |

* cited by examiner

ROOF TOP UNIT TRANSPORT AND LIFT DEVICE AND SYSTEM, AND METHODS OF USE THEREOF

CROSS-REFERENCE TO RELATED APPLICATIONS

This application claims priority to U.S. Provisional Application No. 62/465,625, filed Mar. 1, 2017. The disclosure of the prior application is hereby incorporated in its entirety by reference.

FIELD OF THE INVENTION

Aspects of the present disclosure relate to devices and systems to transport and lift and move heavy items (also interchangeably referred to herein as "objects to be transported"), and methods of use thereof, and in particular to a transporter and lift device or system for a roof top unit (RTU), such as a heating and/or air condition unit, or the like.

BACKGROUND

There are times when a rooftop air conditioning or refrigeration unit or system needs to be moved or set into position, such as on the roof of a building. For example, the curb or other base or location onto which such system is to be placed may be far from the edge of the roof, requiring assistance with transport after placement on the rooftop. This need may present a problem, as well as others, due to the difficulty and/or cost in transport.

For example, in some related art solutions, a 30 ton crane system may be used to relatively inexpensively place and move the RTU or other system, but the crane system may be unable to extend sufficiently so as to place the RTU or other system on a curb located far from the edge of the building. Other related art solutions may include use of a much larger and much more expensive crane, such as a 100-175 ton crane. Such larger cranes may cost 10 times as much or more than a 30 ton crane.

Yet another option in the related art is to use a helicopter or other similar transport vehicle to move the RTU or other system, but this approach is also typically very expensive.

Example of other devices of the related art include Pro Lift Model # B1230 made by Pro Lift of Terrell, Tex. (see, e.g., www.pro-lift.com) and aluminum or steel Gantry Cranes manufactured by several companies ie. Wallace Cranes model Tri-Adjustable Aluminum to 3 ton. (see, e.g., www.wallacecranes.com)

SUMMARY

Aspects of the present disclosure relate to devices and systems for solving the problems of the related art discussed above, as well as others, and methods and use of such devices and systems.

Aspects of an example device or system in accordance with the present disclosure may include inexpensive mechanical lift features that may be easily assembled onto system components that include mobile features, such as wheels. Such an example device may be lightweight, and thereby easily transported to and assembled on a building roof or other remote location. In addition, such an example device may prevent or minimize any possible damage to the roof or other location by virtue of the wheels and other load handling features.

Aspects of the lift features of an example device or system may include one or more jacks (e.g., conventional screw or pneumatic jacks) incorporated into or attached to the device or system so as to readily and easily allow raising and lowering of the RTU or other unit.

Aspects of an example device or system in accordance with the present disclosure may further include a small overall footprint (e.g., less than one squire foot) of the device or system when disassembled, so as to enable easy transport to and from a remote location (e.g., for delivery to a building roof). Among other advantages, the small footprint and light weight of the device or system removes the necessity of using a crane or other separate mechanism to deliver the device or system to the roof or other remote location for use.

Further, aspects of an example device or system may include many replacement parts that may easily be obtained (e.g., for repair) from a local hardware or other supply house. In addition, in some variations, the device or system may require no electricity or other power supply to operate, thereby minimizing potential limitations on use and operation, such as where power supply would thereby be needed, as well as reducing potential maintenance needs.

The device and system may include, for example, three or more wheeled attachment features that are selectively attachable to an object to the transported. Each wheeled attachment feature may include first selectively variable height mechanism, such as a jack; a securing mechanism for securing each wheeled attachment feature to the object to be transported, the securing mechanism including, for example, a mounting plate and a securing tab for holding the wheeled attachment feature to the object, such as via an opening in a wall or support feature of the object; and a wheel coupled directly or indirectly (e.g., through an upright inner sleeve) to the variable height mechanism, the wheel allowing the object to be moved by rotation thereof.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Transport, assembly, and use of an example device or system in accordance with aspects of the present invention will now be further described.

Figure 1:
FIG. 1 is a Photostat showing various example components for a device or system in accordance with aspects of the present disclosure.

FIG. 1 is a Photostat showing various example components for an unassembled device or system in accordance with aspects of the present disclosure.

Figure 2:
FIG. 2 is a Photostat showing an example fixed upright for a device or system in accordance with aspects of the present disclosure.
Figure 3:
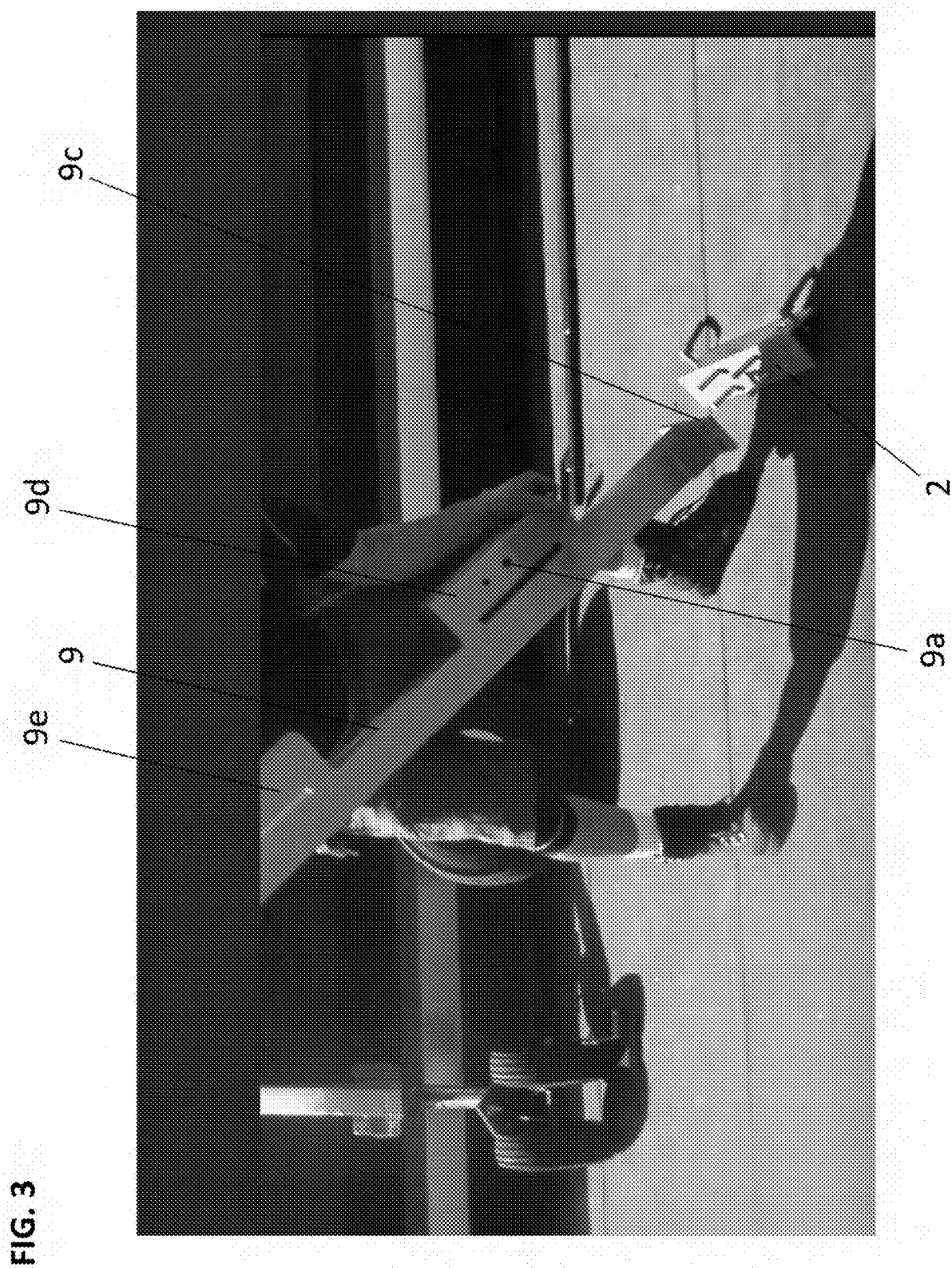
FIG. 3 is a Photostat showing the example fixed upright of FIG. 2 for engagement with an example mounting plate for a device or system in accordance with aspects of the present disclosure.

FIG. 2 is a Photostat showing an example fixed upright portion 9 for a device or system in accordance with aspects of the present disclosure in process. FIG. 3 is a Photostat showing the example fixed upright portion 9 of FIG. 2 in process of being attached to a mounting plate 2. The fixed upright portion 9 may include, for example, an end flange portion 9a (a welded or attached approximately 4" by 6" plate) having holes or openings therein, and/or other features, for attaching the fixed upright portion 9 to the mounting plate 2, such as via one or more bolts or other fasteners, or alternatively other fastening features or mechanisms, such as clips, clamps, or adhesives. The fixed upright portion 9 may also include one or more sleeve portions 9d, 9e for receiving another system component, such as an upright inner sleeve, described further below. Each of the sleeve portions 9d, 9e, may include, for example, one or more holes or openings 9c therein for use in securing components to one another.

Figure 4:
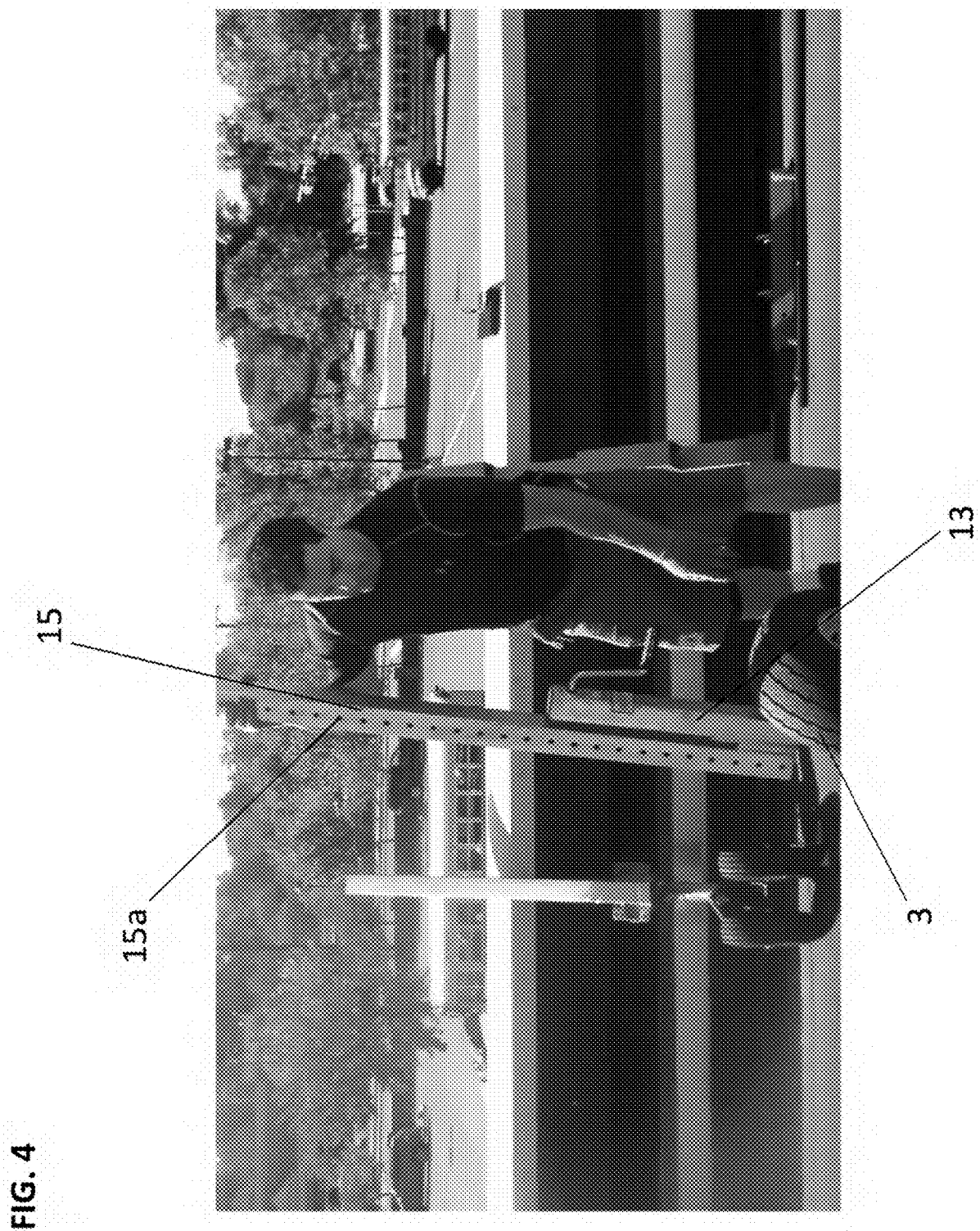
FIG. 4 is a Photostat showing an example upright inner sleeve with height adjustment openings and an attached jack with fixed position tire for a device or system in accordance with aspects of the present disclosure.

FIG. 4 is a Photostat showing an example upright inner sleeve 15 for a fixed position wheel 15 (e.g., a sleeve having holes or openings to allow variable height adjustment, such as up to 35") with one or more height adjustment openings 15a and an attached jack for fixed wheel 13 (e.g., jack with variable lift height range, such as 0" to 15") having a fixed position wheel 3, such as a fixed position tire (e.g., a pneumatic tire that does not swivel or otherwise move relative to the axial direction of the attached jack 13; for example, such wheel is therefore unusable or less usable for directing an object to which the wheel may be attached) in turn attached thereto.

Figure 5:
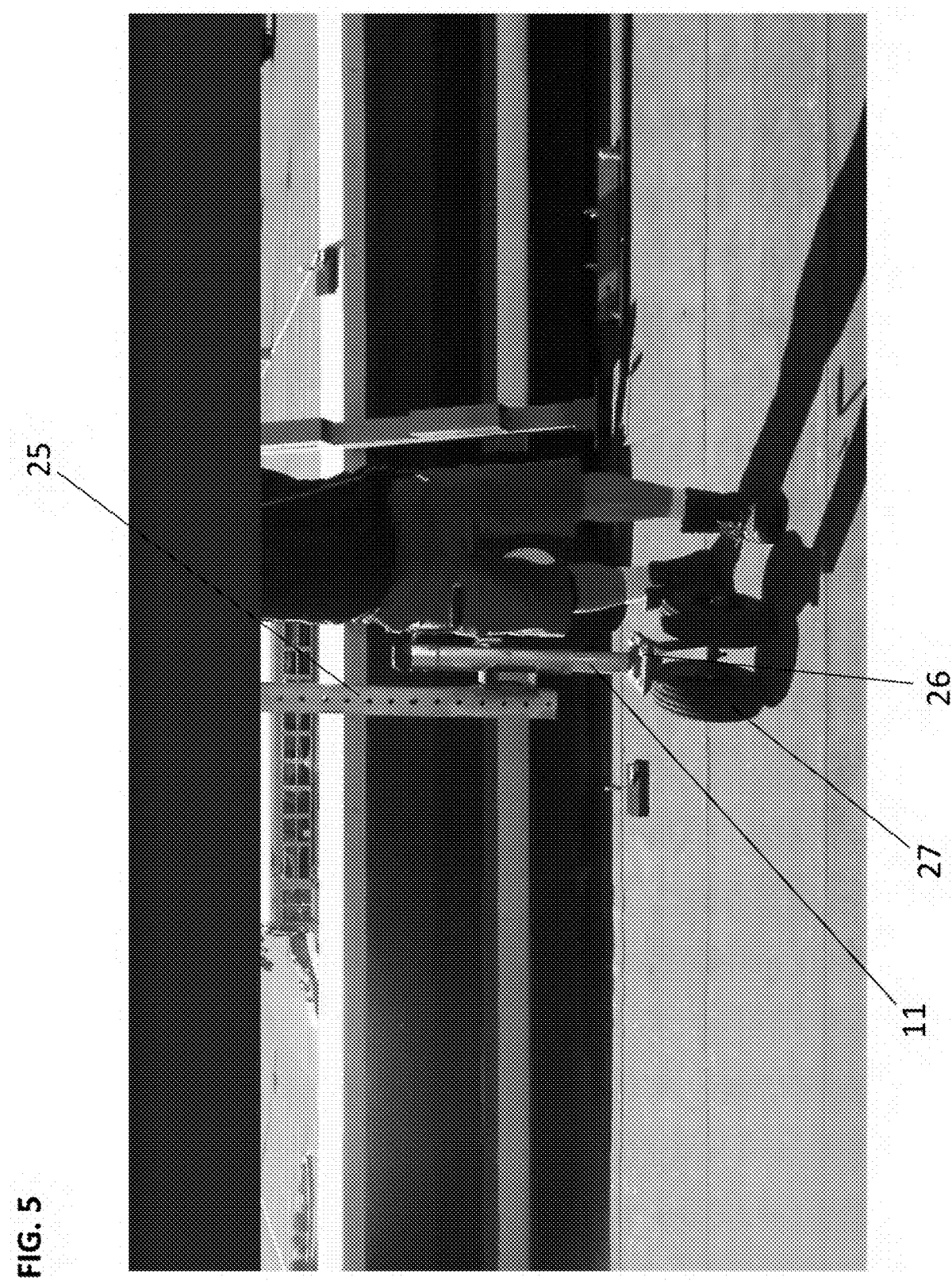
FIG. 5 is a Photostat showing an example upright inner sleeve with height adjustment openings and an attached jack with castor mounted dual tires a device or system in accordance with aspects of the present disclosure.
Figure 6:
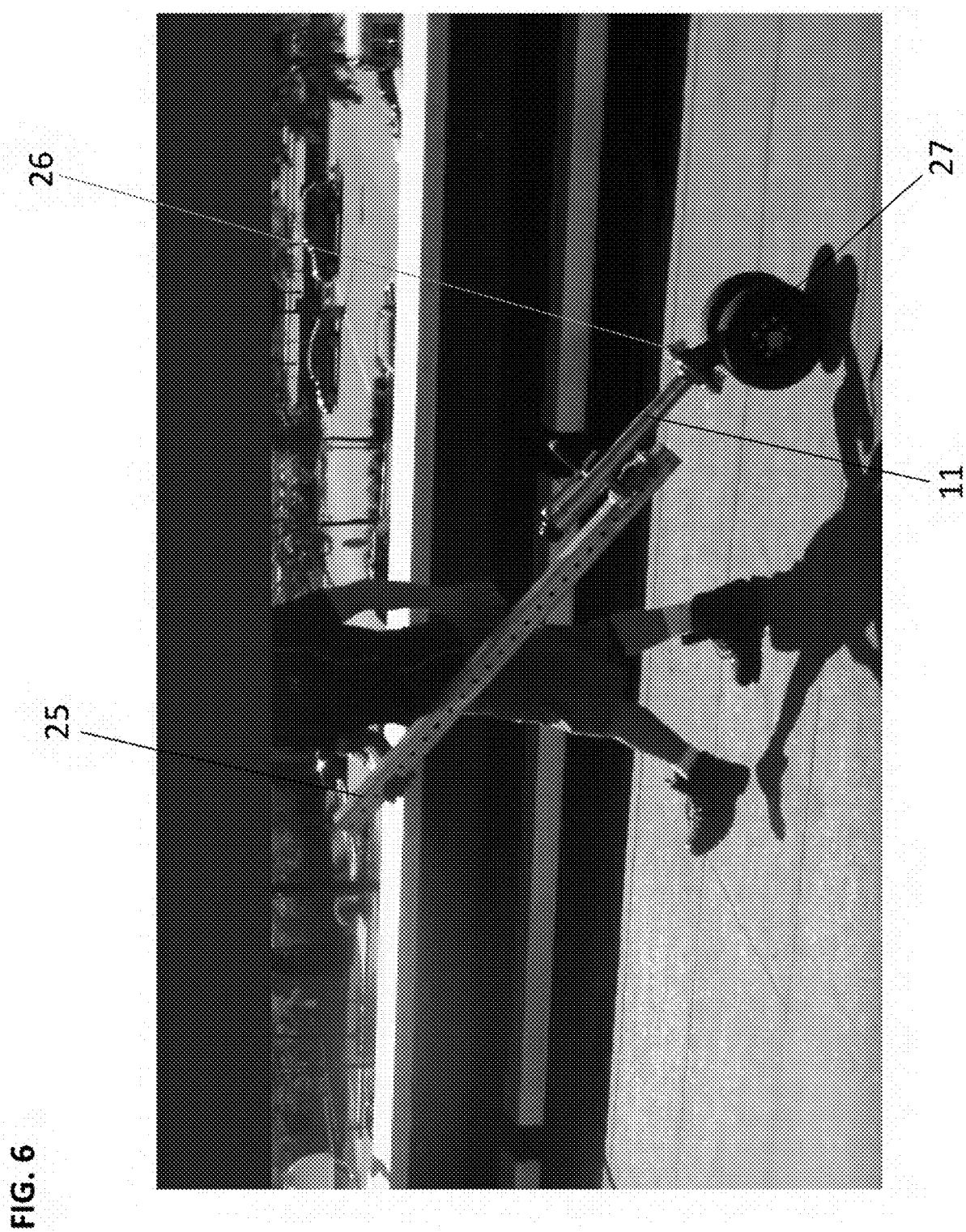
FIG. 6 is a Photostat showing the upright inner sleeve and attached jack of FIG. 5 for a device or system in process of being transported, in accordance with aspects of the present disclosure.

FIG. 5 is a Photostat showing another example upright inner sleeve 25 for a directional wheel 27, the upright inner sleeve 25 having one or more height adjustment openings or holes 25a and an attached jack for directional wheel 11 (e.g., a manually cranked or hydraulically driven jack) with caster or other similarly operating directional wheel feature 26 (e.g., an example 8" caster assembly) and mounted directional wheel 27, such as dual tires. Such caster assembly or other similarly operating directional wheel feature 26 may be attached to the lower end of each jack 11, for example, so as to allow an object to be transported, to which such jack 11 is attached, to be moved about an area, such as the roof a building. FIG. 6 is a Photostat showing the upright inner sleeve 25 and attached jack 11 of FIG. 5 for a device or system in process of being moved about, in accordance with aspects of the present disclosure.

Figure 7:
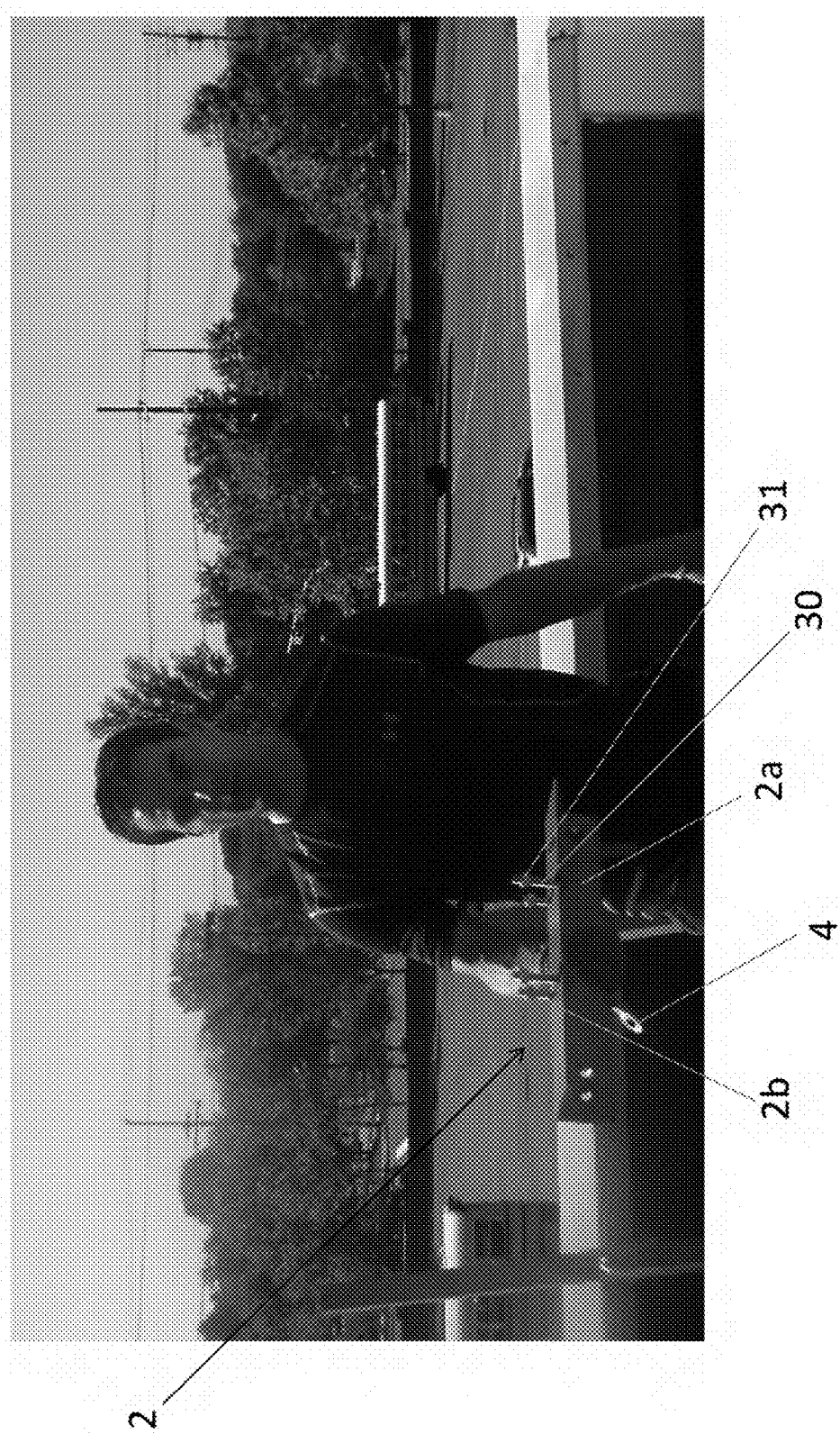
FIG. 7 is a Photostat showing an example mounting plate for attachment to an example object to be transported and to various components of a device or system in accordance with aspects of the present disclosure.
Figure 8:
FIG. 8 is a Photostat showing the example mounting plate of FIG. 7 and attachable tab for use in attachment to an example object to be transported, in accordance with aspects of the present disclosure.

FIG. 7 is a Photostat showing a side view of the example mounting plate 2 of FIG. 2. The mounting plate 2 may be attached to an example object to be transported (e.g., a heating and air conditioning or "HVAC" unit) and to various other components of a device or system in accordance with aspects of the present disclosure, as will be described further below. As shown in FIG. 7, the mounting plate 2 may include one or more openings or other features for use in attachment of the mounting plate 2 to the object to be transported and/or other features of the device/system. For example, one or more bolts 30 having engagable nuts 31 may extend through one or more openings in a first extending body portion 2a of the mounting plate 2. In addition, one or more attachable mounting tabs 4 may also be attachable to the mounting plate 2, such as via a second extending body portion 2b of the mounting plate 2. FIG. 8 is a Photostat showing another view of the example mounting 2 plate of FIG. 7 and attachable mounting tab 4 for use in attachment to an example object to be transported, in accordance with aspects of the present disclosure.

Figure 9:
FIG. 9 is a Photostat showing the example fixed upright being initially engaged with the upright inner sleeve of a device or system in accordance with aspects of the present disclosure.
Figure 10:
FIG. 10 is a Photostat showing the example fixed upright further engaged with the upright inner sleeve of a device or system in accordance with aspects of the present disclosure.

FIG. 9 is a Photostat showing the example fixed upright portion 9 being initially engaged with the upright inner sleeve 15 of a device or system in accordance with aspects of the present disclosure. The upright portion 9 may include an approximately 4"×4" square cross-sectional tube of approximately 4' length. FIG. 10 is a Photostat showing the example fixed upright portion 9 being further engaged with the upright inner sleeve 15 of a device or system in accordance with aspects of the present disclosure. As shown in FIG. 10, the inner sleeve 15 may be slid into openings in the attached sleeve portions 9d, 9e of fixed upright portion 9. FIG. 10 also shows example pins (e.g., pin 35) that may be used to pin the fixed upright 9 relative to the upright inner sleeve 15. The inner sleeve 15 may have an attached (e.g., welded) jack 13 and fixed wheel assembly 3. The openings 15a in the inner sleeve 15 enable the inner sleeve 15 when engaged with and pinned to fixed upright portion 9 to be variable over a greater overall length range than, for example, would be allowed solely by the extension limit of a conventional 15" jack. In use to increase lift, the jack 13 may simply be retracted, the securing pins (e.g., pin 35) removed, and the fixed upright 9 then slid relative to the inner sleeve 15 to a new position. With the wheel 3 on the ground, for example, the sleeve 15 may then be re-pinned to change height. This process may be repeated for jacks 13 placed at multiple locations about an object to be transported. An additional 15" of lift, for example, via the jacks 13, may then be obtained in lifting the object to be transported.

Figure 11:
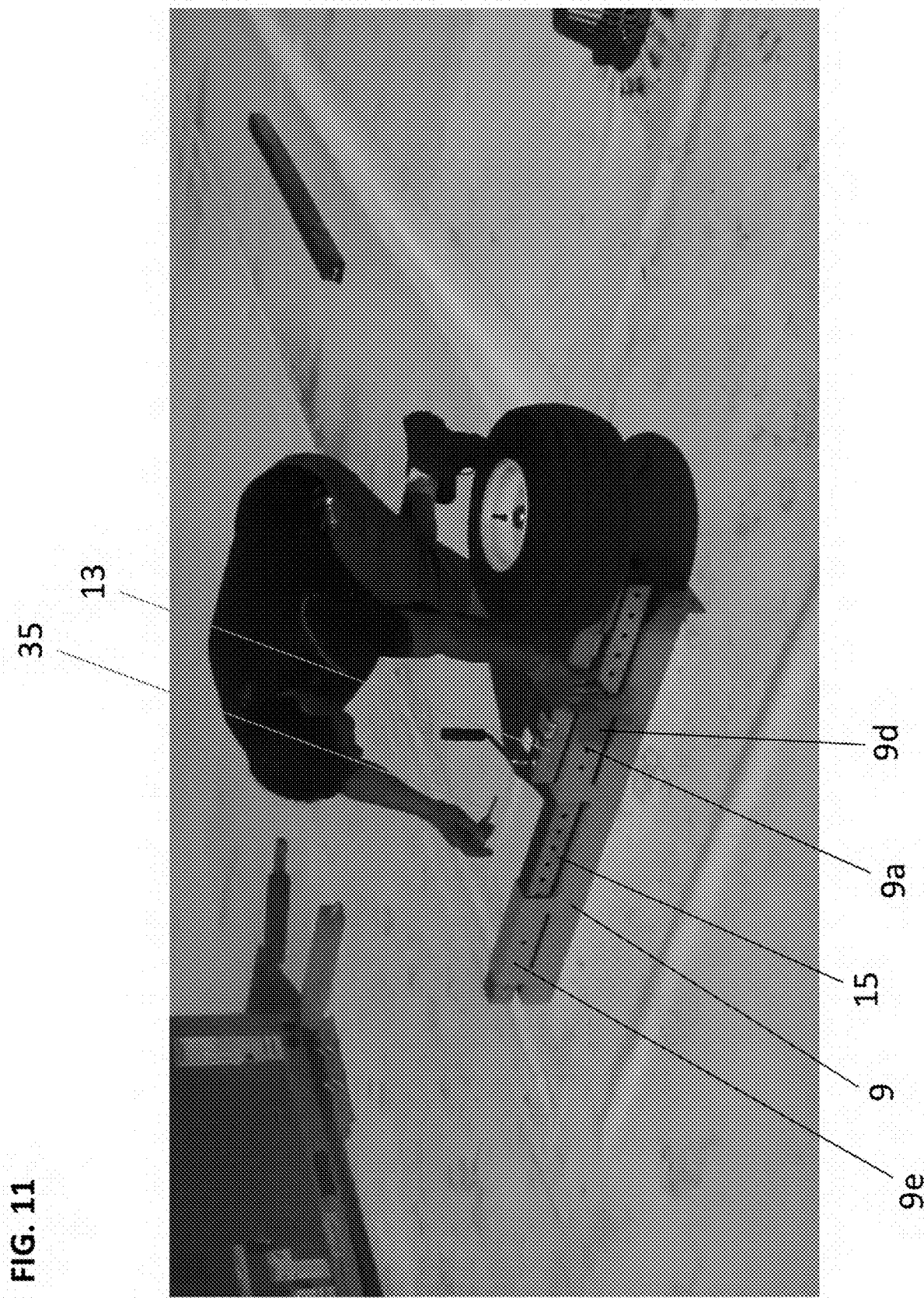
FIG. 11 is a Photostat showing a first pin to be affixed to the example fixed upright engaged with the upright inner sleeve of a device or system in accordance with aspects of the present disclosure.
Figure 12:
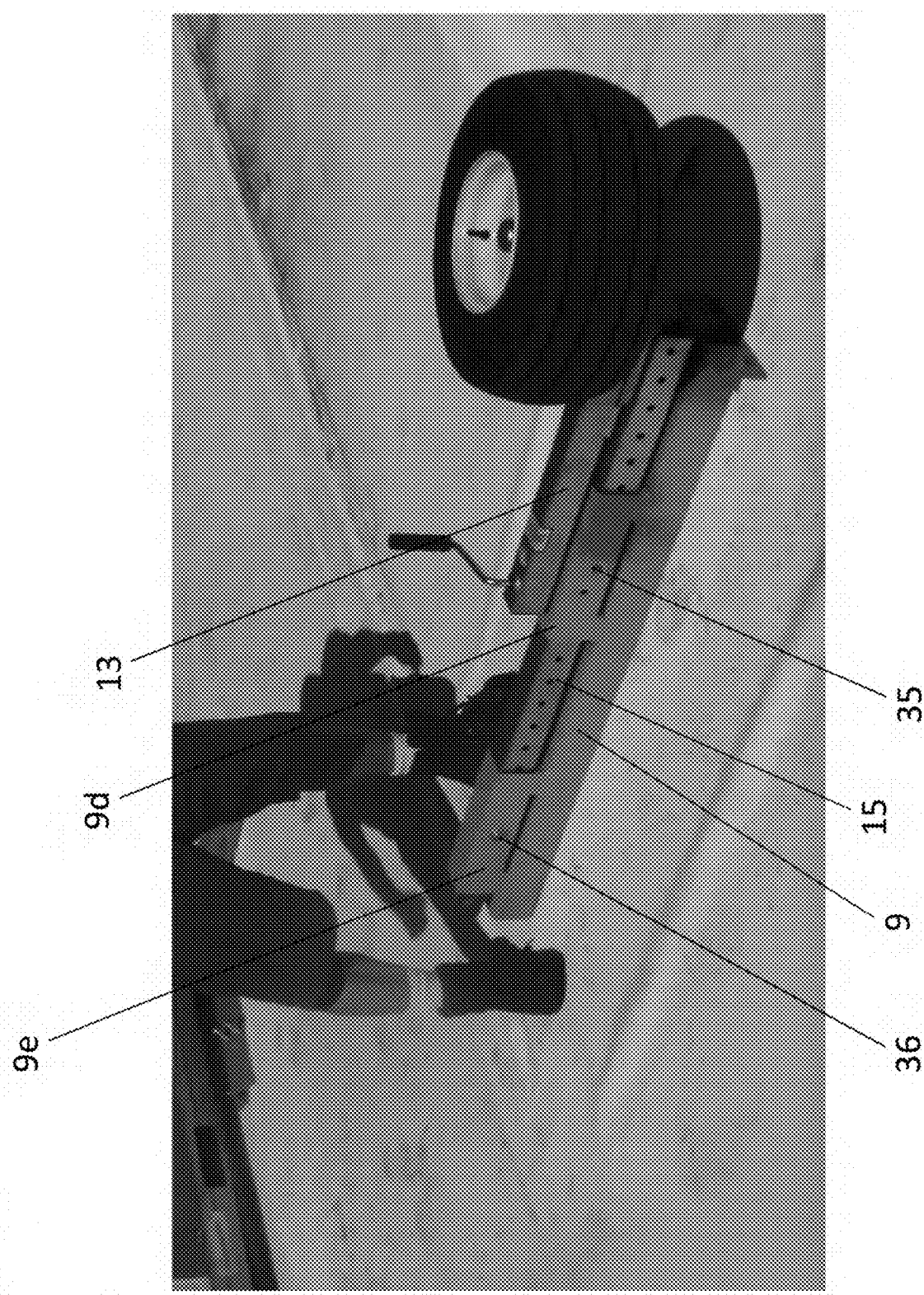
FIG. 12 is a Photostat showing the first pin and a second pin affixed to the example fixed upright engaged with the upright inner sleeve of a device or system in accordance with aspects of the present disclosure.

FIG. 11 is a Photostat showing a first pin 35 to be engaged with the fixed upright portion 9 and the upright inner sleeve 15, such as via the opening 9a in sleeve portion 9d of fixed upright portion 9. FIG. 12 is a Photostat showing the first pin 35 and a second pin 36 engaged with the fixed upright portion 9 via openings 9a, 9b, respectively, and via corresponding openings in the upright inner sleeve 15, such that the fixed upright portion 9 and upright inner sleeve 15 do not move relative to one another.

Figure 13:
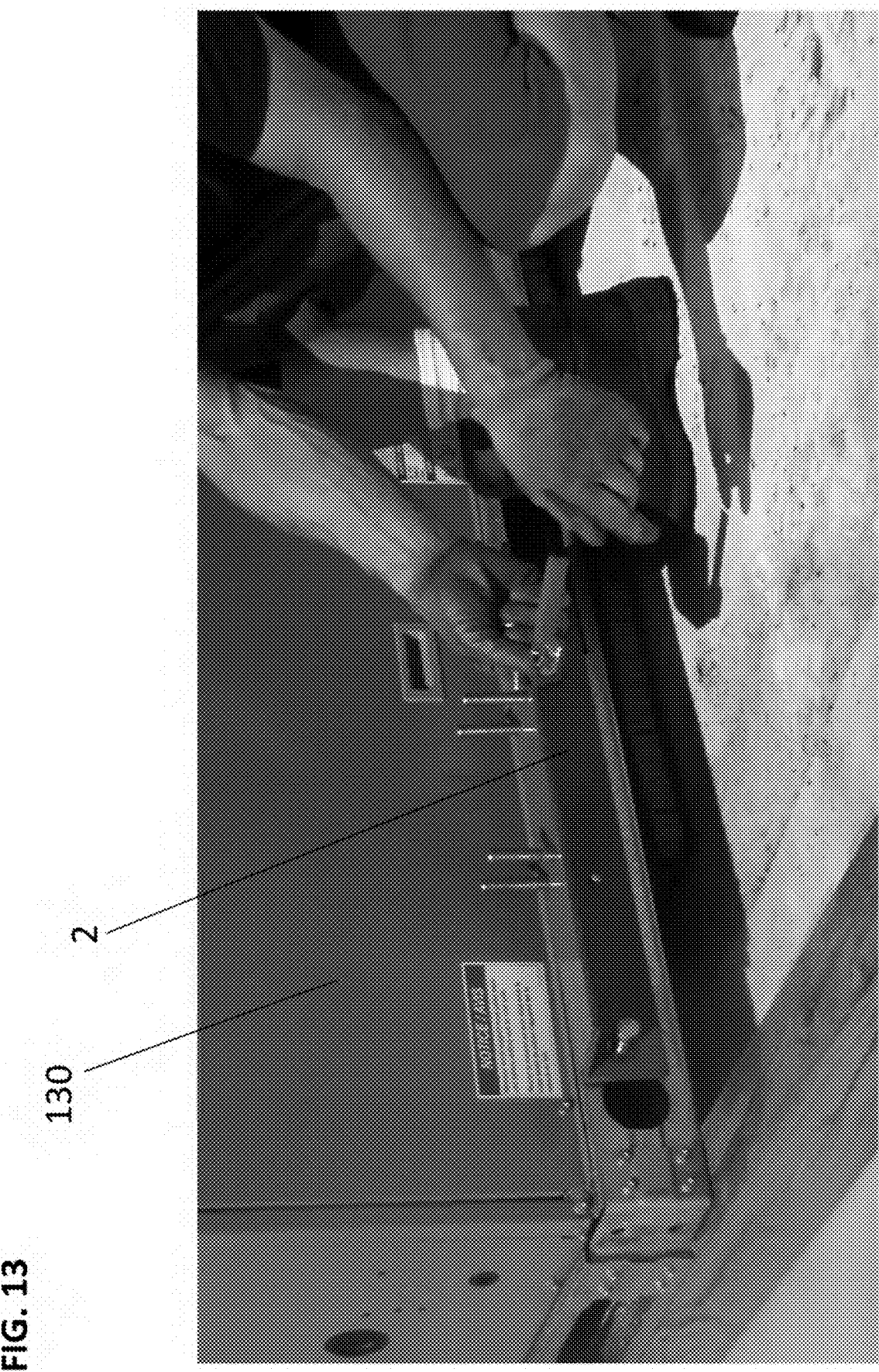
FIG. 13 is a Photostat showing an example mounting plate being attached to an example object to be transported using a device or system in accordance with aspects of the present disclosure.

FIG. 13 is a Photostat showing an example mounting plate 2 in process of being attached to an example object to be transported 130, in accordance with aspects of the present disclosure. The mounting plate 2 may be attached to the object to be transported 130 via one or more nuts and bolts via corresponding openings in the plate 2 and in the object 130, or via other attachment mechanisms and/or features, as will be described in further detail below.

Figure 14:
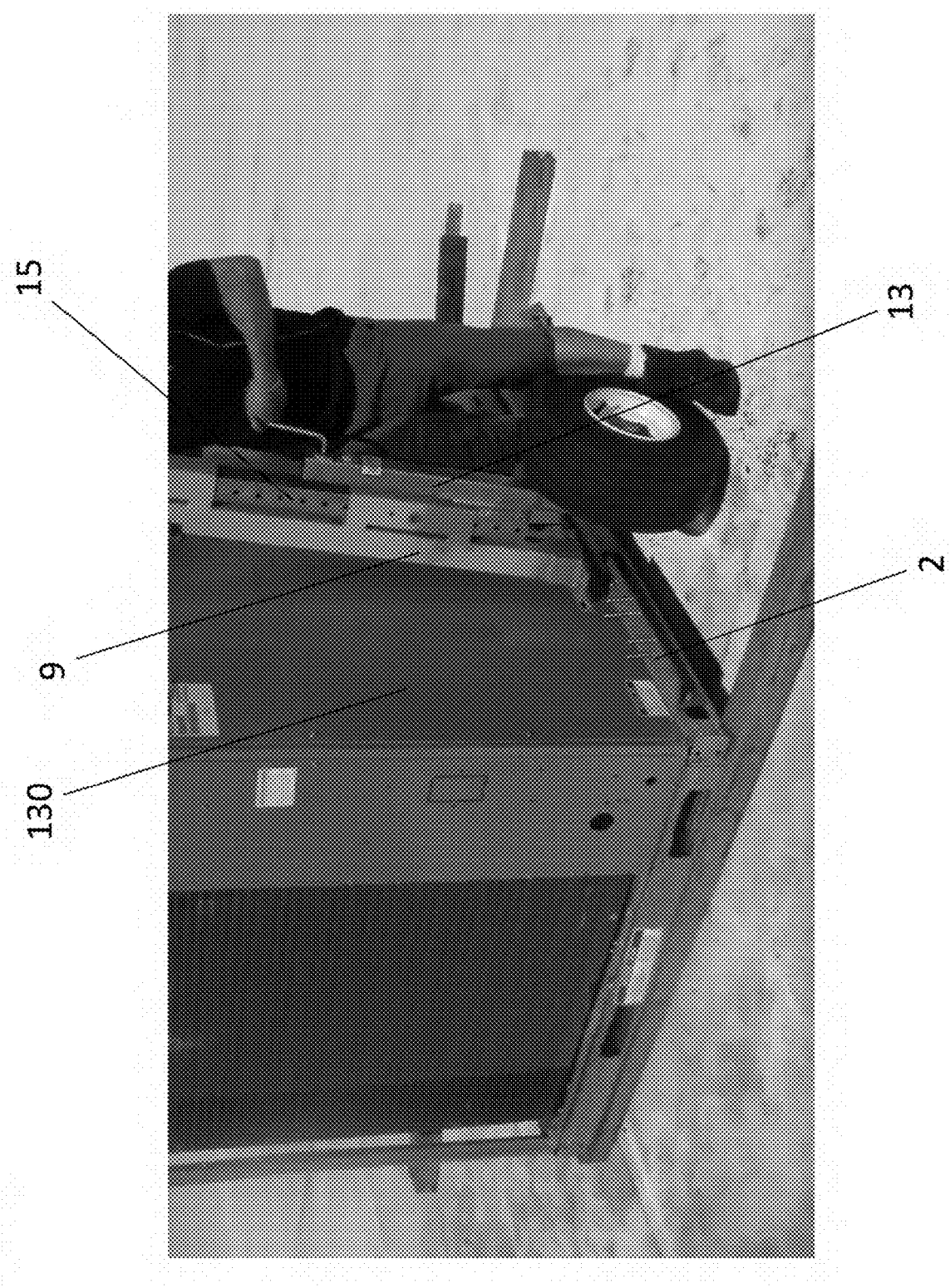
FIG. 14 is a Photostat showing the example fixed upright with engaged upright inner sleeve of FIGS. 10-12 being attached to the example mounting plate of FIG. 13, which in turn is attached to an example object to be transported, in accordance with aspects of the present disclosure.
Figure 15:
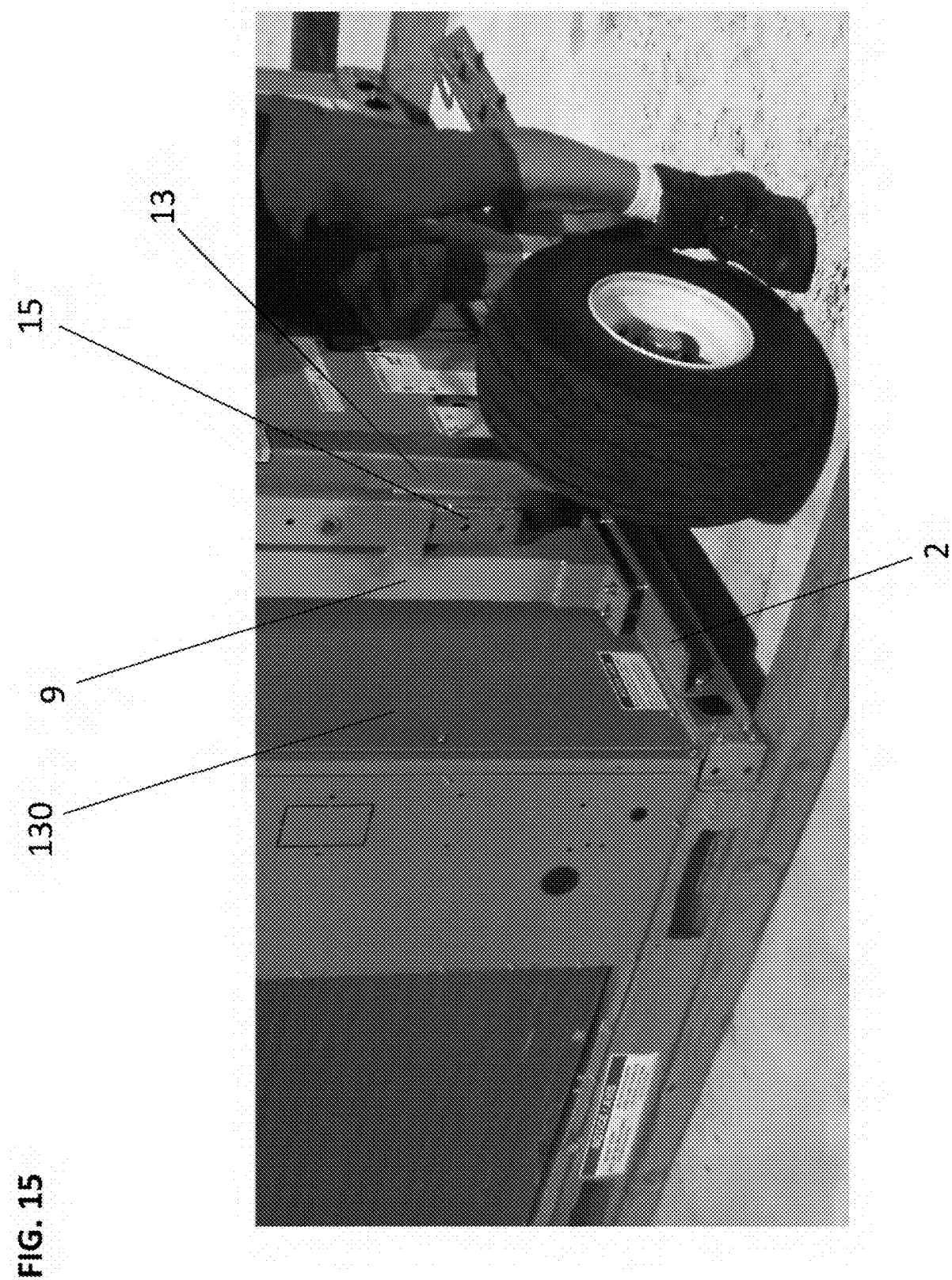
FIG. 15 is a Photostat showing the example fixed upright of FIGS. 10-12 further engaged with the example mounting plate of FIG. 13, in accordance with aspects of the present disclosure.
Figure 16:
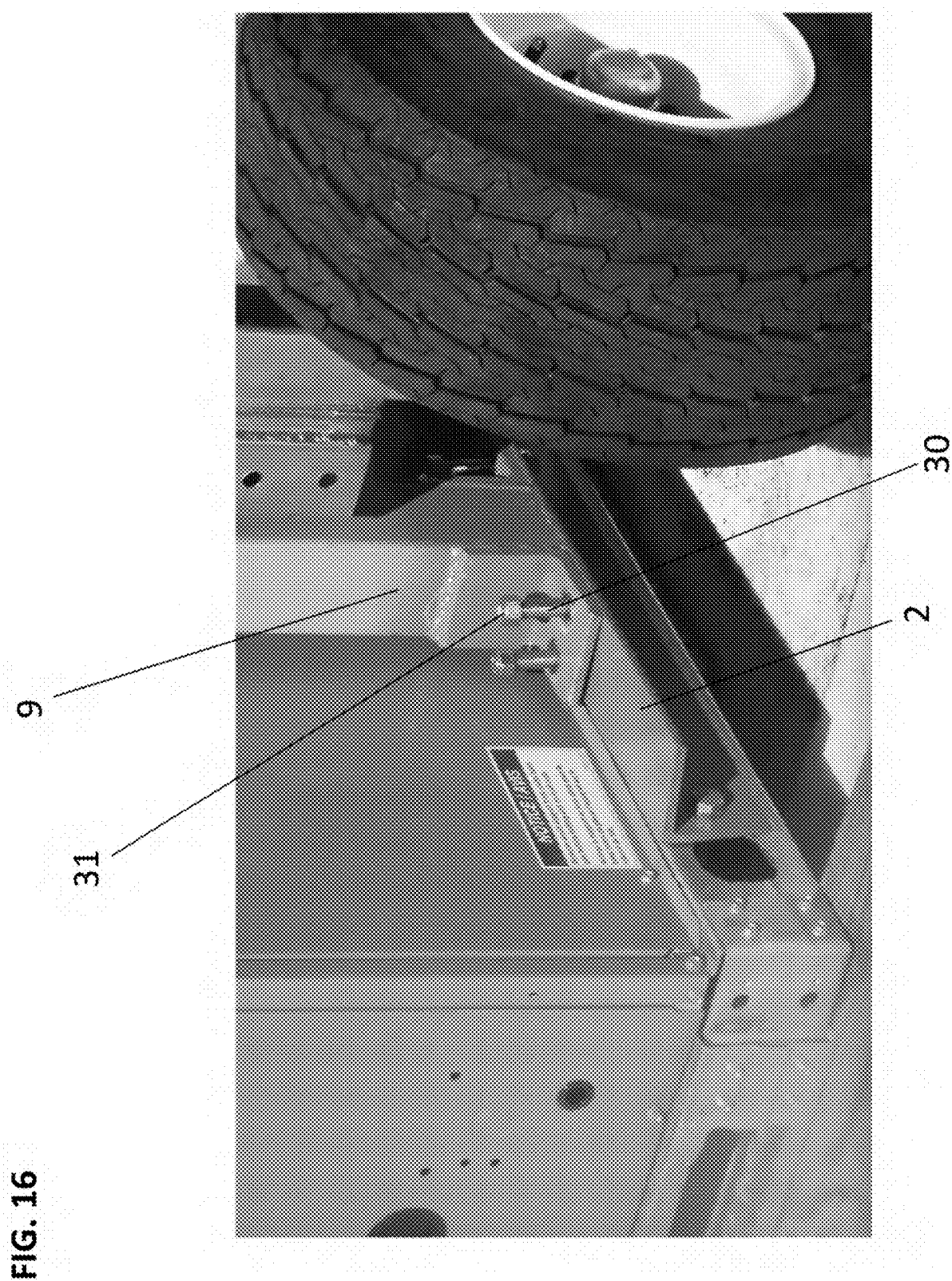
FIG. 16 is a Photostat showing the example fixed upright of FIGS. 10-12 further engaged with the example mounting plate of FIG. 13 with nuts and bolts in place for securing, in accordance with aspects of the present disclosure.

FIG. 14 is a Photostat showing the example fixed upright portion 9 with engaged upright inner sleeve 15 of FIGS. 10-12 being attached to the example mounting plate 2 of FIG. 13, which in turn is attached to an example object to be transported 130, in accordance with aspects of the present disclosure. FIG. 15 is a Photostat further showing the example fixed upright portion 9 of FIGS. 10-12 being engaged with the example mounting plate 2. FIG. 16 is a Photostat showing the use of example nuts and bolts 30, 31, respectively, for securing the upright portion 9 to the object 130, in accordance with aspects of the present disclosure.

Figure 17:
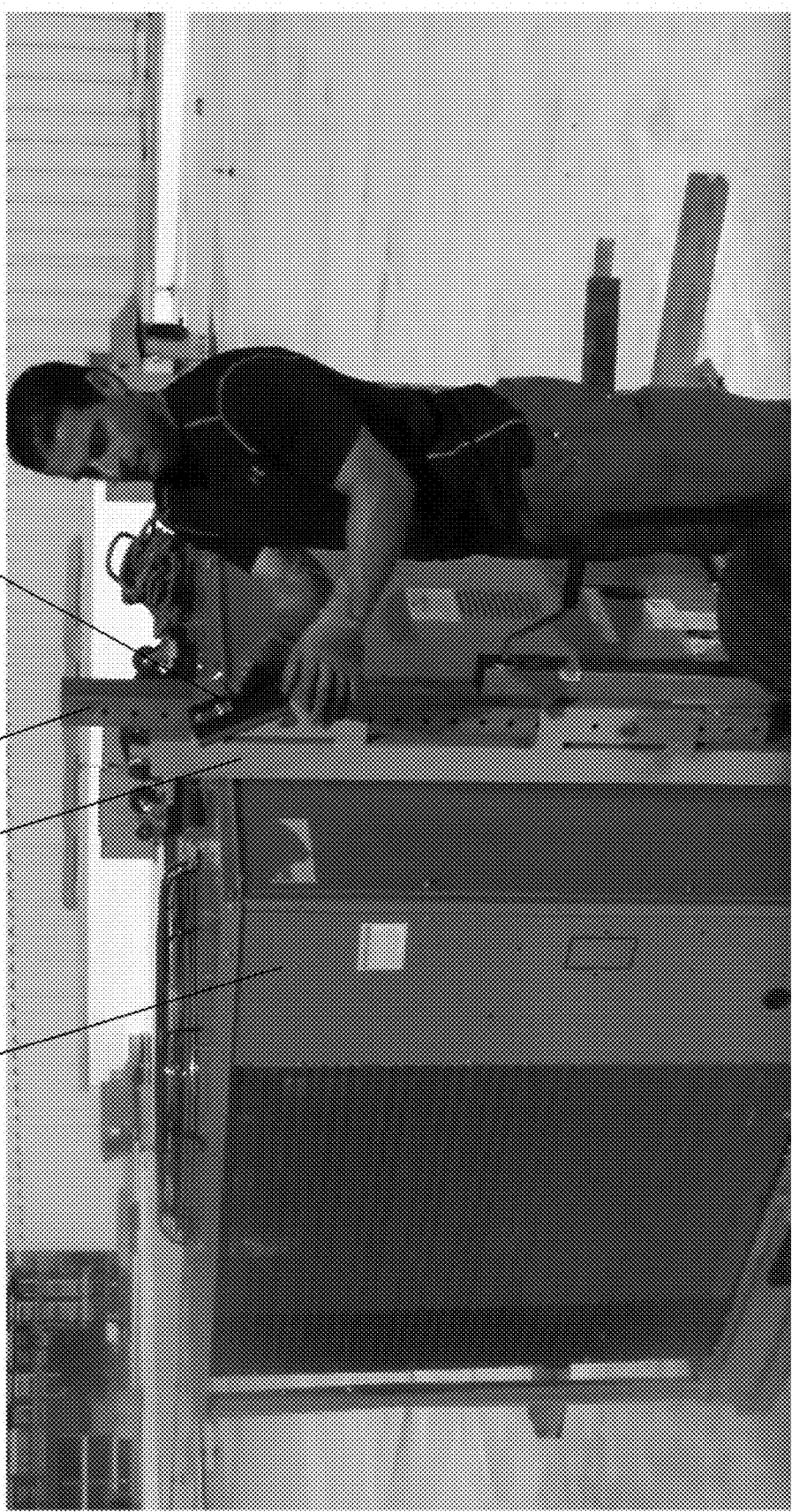
FIG. 17 is a Photostat showing the example fixed upright of FIGS. 10-12 engaged with the object to be transported (e.g., via the mounting plate of FIG. 13), the example fixed upright also being engaged with the upright inner sleeve, and a cushioning bracket being engaged therewith, in accordance with aspects of the present disclosure.

FIG. 17 is a Photostat showing the example fixed upright portion 9 of FIGS. 10-12 engaged with the object to be transported 130 (e.g., via the mounting plate 2 of FIG. 13), the example fixed upright portion 9 also being engaged with the upright inner sleeve 15, along with a cushioning bracket 6 being engaged therewith, in accordance with aspects of the present disclosure. The cushioning bracket 6 may be or have a magnetic element, for example, to allow easy temporary attachment at a selected location to the fixed upright portion 9 and/or the object to be transported 130.

Figure 18:
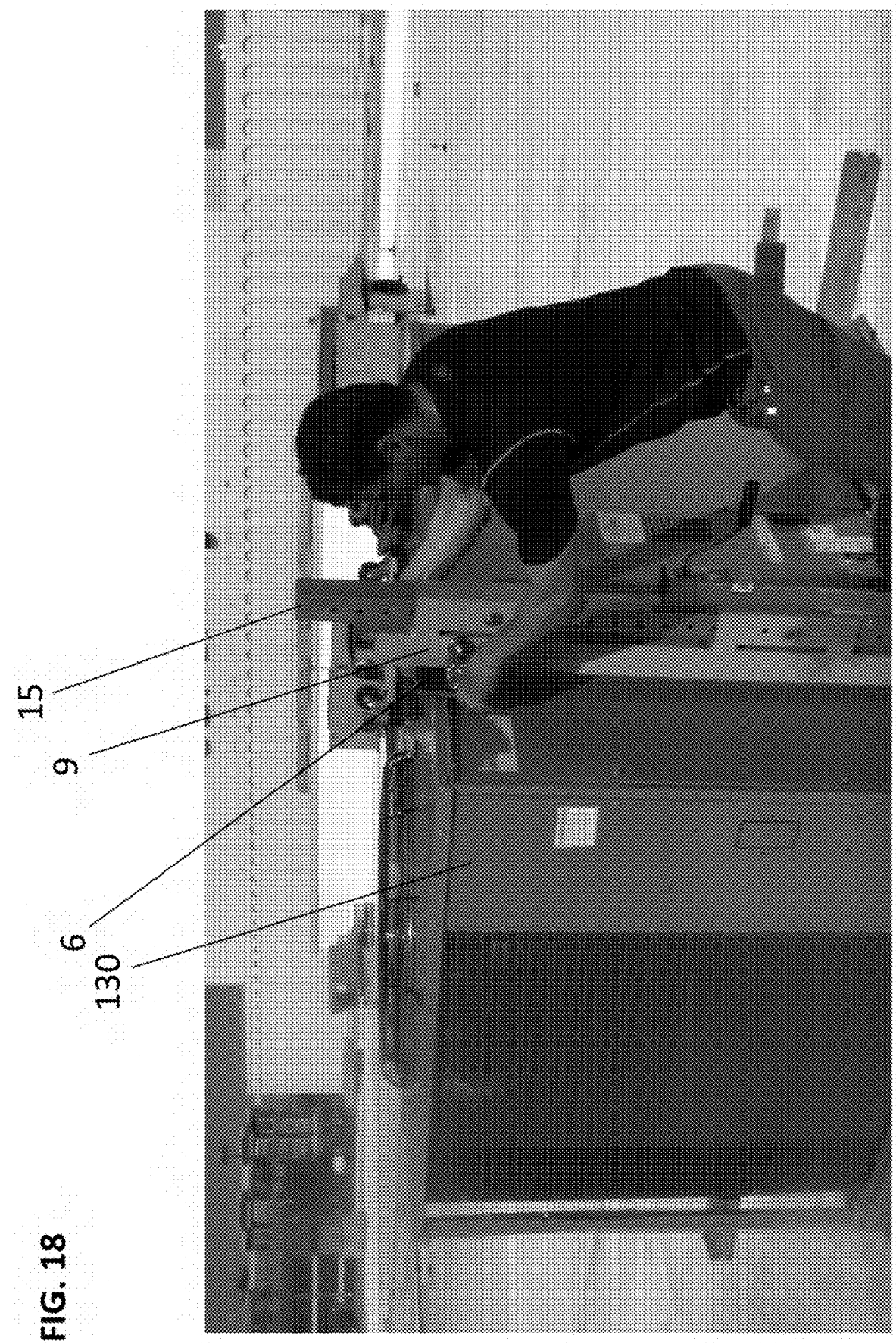
FIG. 18 is a Photostat showing another view of the example fixed upright of FIGS. 10-12 engaged with the object to be transported (e.g., via the mounting plate of FIG. 13), the example fixed upright also being further engaged with the upright inner sleeve, and a cushioning bracket being engaged therewith, in accordance with aspects of the present disclosure.

FIG. 18 is a Photostat showing another view of the example fixed upright 9 of FIGS. 10-12 engaged with the object to be transported 130 (e.g., via the mounting plate 2 of FIG. 13), the example fixed upright portion 9 also being engaged with the upright inner sleeve 15, and the cushioning bracket 6 being further engaged therewith, in accordance with aspects of the present disclosure.

Figure 19:
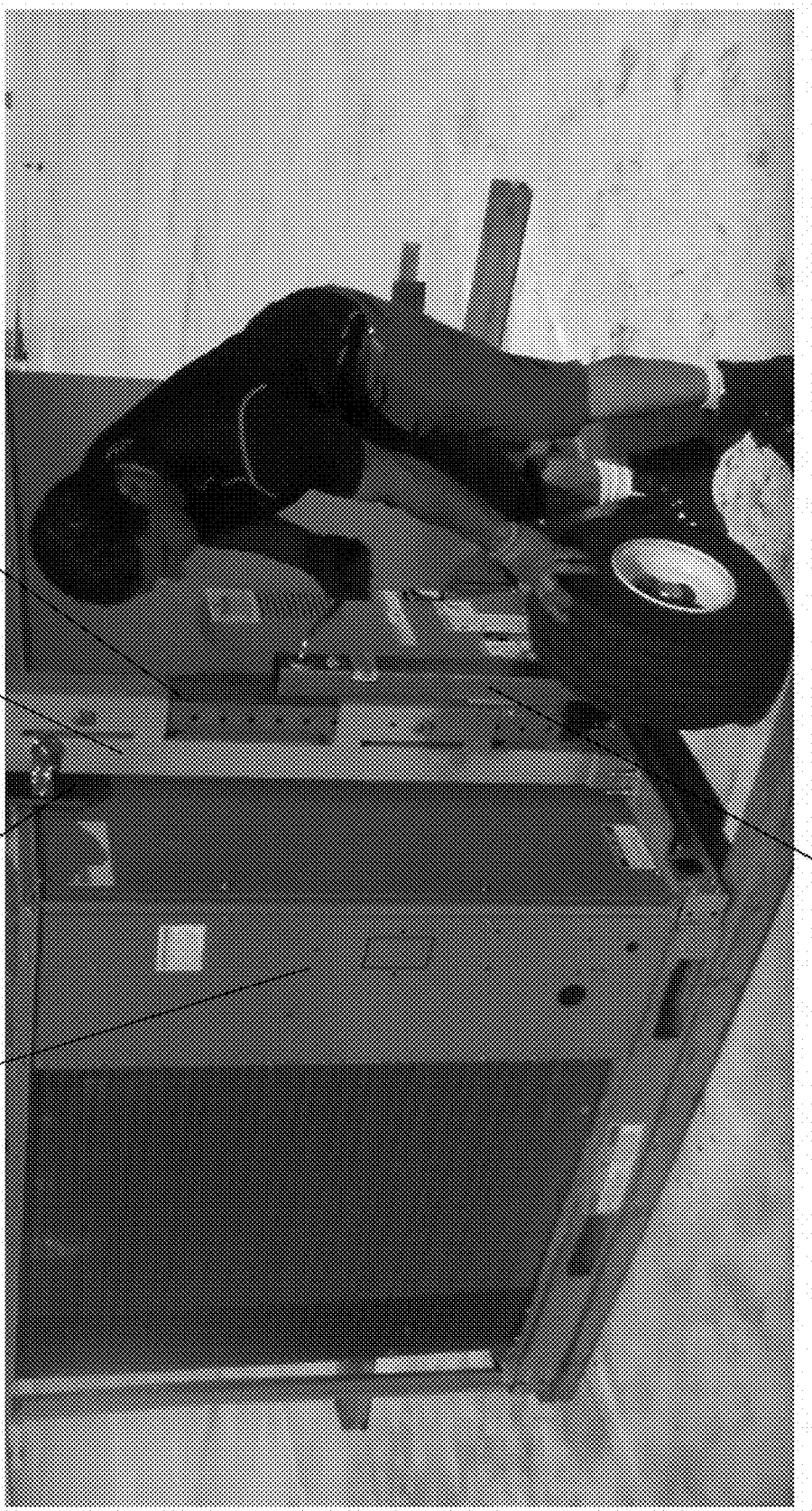
FIG. 19 is a Photostat showing another view of the example fixed upright of FIGS. 10-12 engaged with the example object to be transported (e.g., via the mounting plate of FIG. 13), the example fixed upright also being further engaged with the upright inner sleeve, and a cushioning bracket being engaged therewith, and the jack being operated to raise the object to be transported, in accordance with aspects of the present disclosure.

FIG. 19 is a Photostat showing another view of the example fixed upright portion 9 of FIGS. 10-12 engaged with the example object to be transported 130 (e.g., via the mounting plate 2 of FIG. 13), the example fixed upright portion 9 also being further engaged with the upright inner sleeve 15, and a cushioning bracket 6 being engaged therewith. The jack 13 is further shown being operated to raise or lower the object to be transported 130, in accordance with aspects of the present disclosure.

Figure 20:
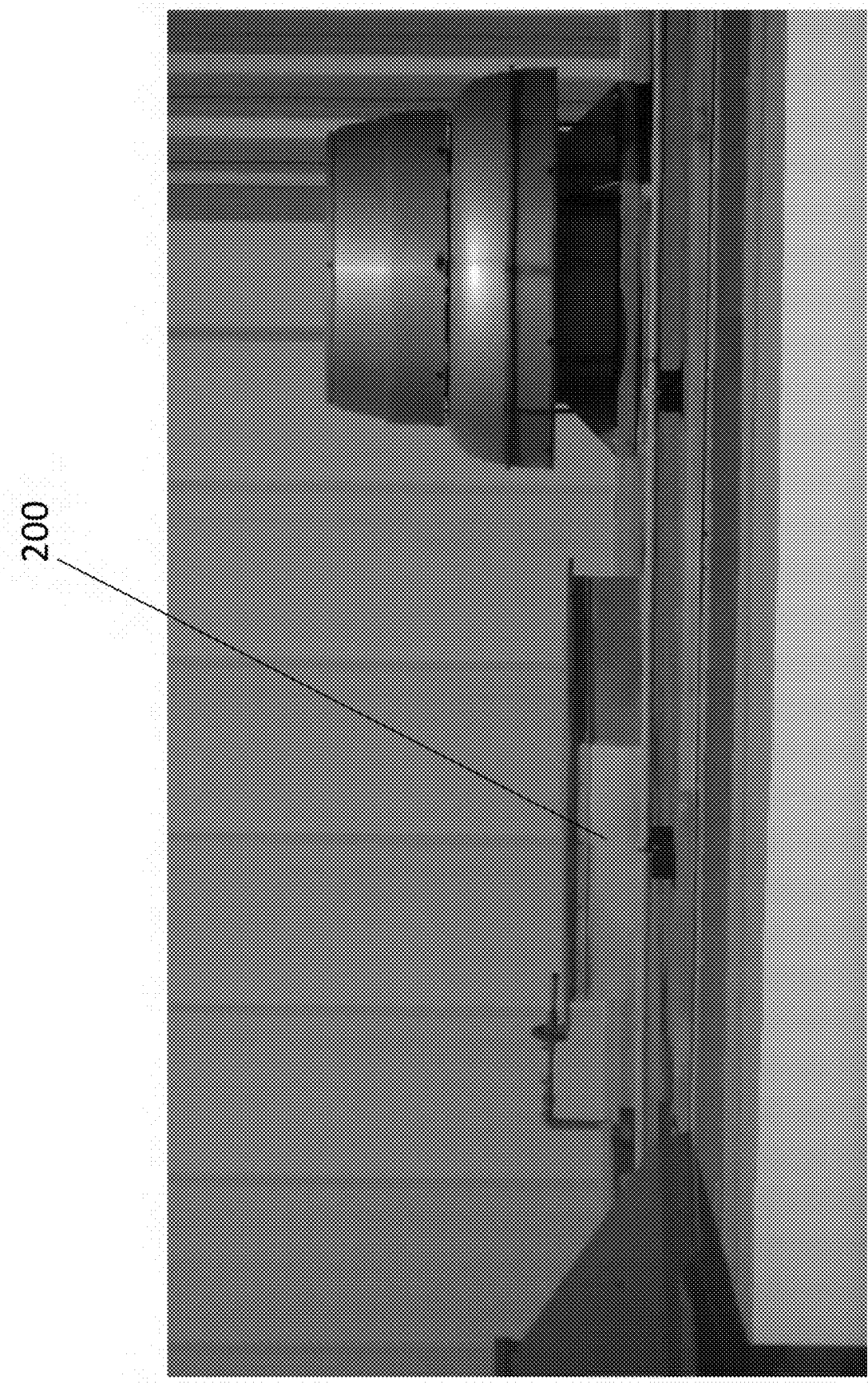
FIG. 20 is a Photostat showing an example mounting point/curb onto which an example object to be transported is to be emplaced, for use in accordance with aspects of the present disclosure.

FIG. 20 is a Photostat showing an example mounting point/curb 20 onto which an object to be transported (e.g., example object to be transported 130 of FIG. 19) is to be emplaced, for use in accordance with aspects of the present disclosure.

Figure 21:
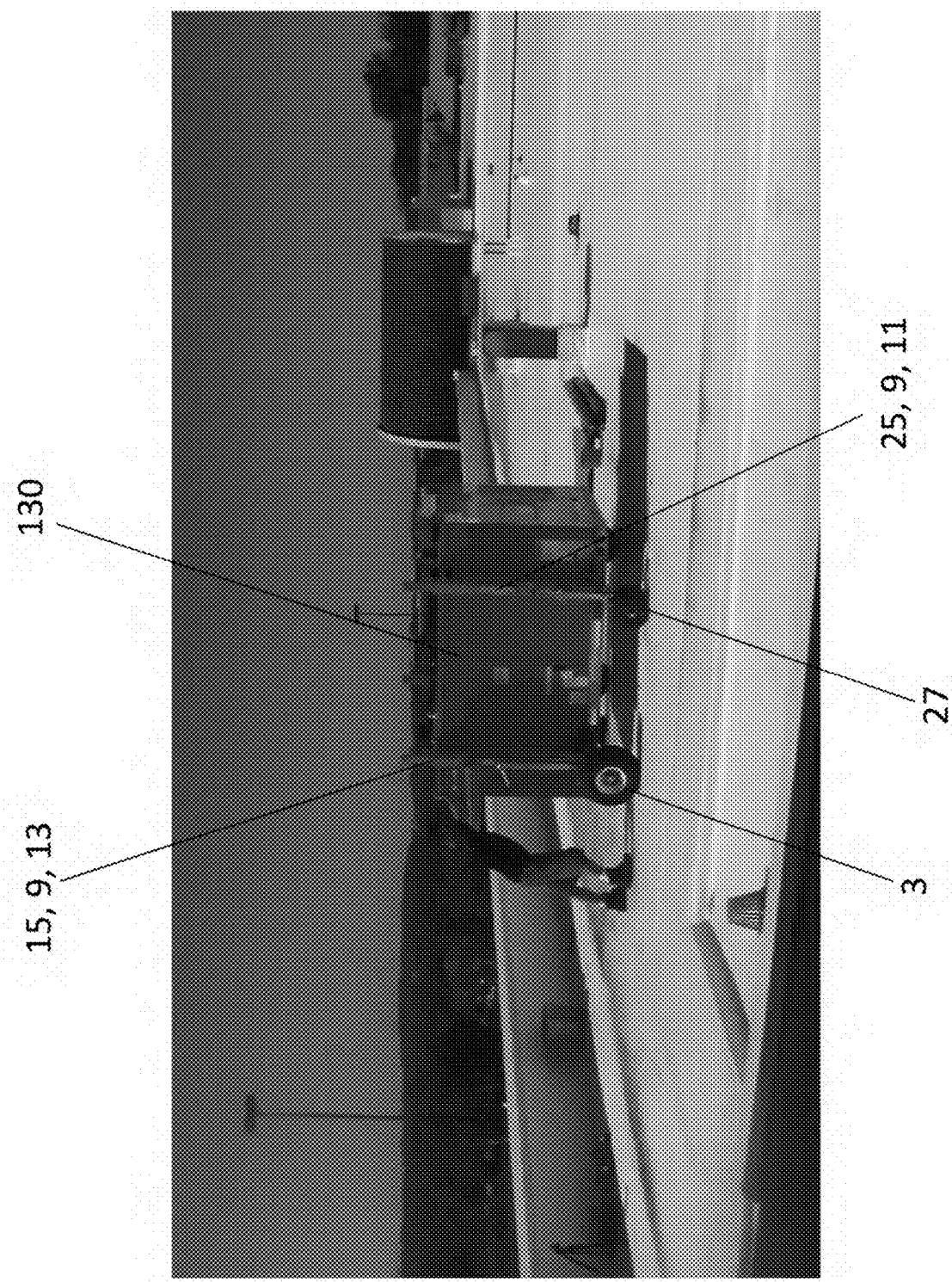
FIG. 21 is a Photostat showing the example object to be transported with a pair of upright inner sleeves engaged with a first pair of fixed upright portions with attached fixed position wheel, and a second pair of fixed upright portions engaged with pair of upright inner sleeves with attached jacks and directional wheels, in accordance with aspects of the present disclosure.
Figure 22:
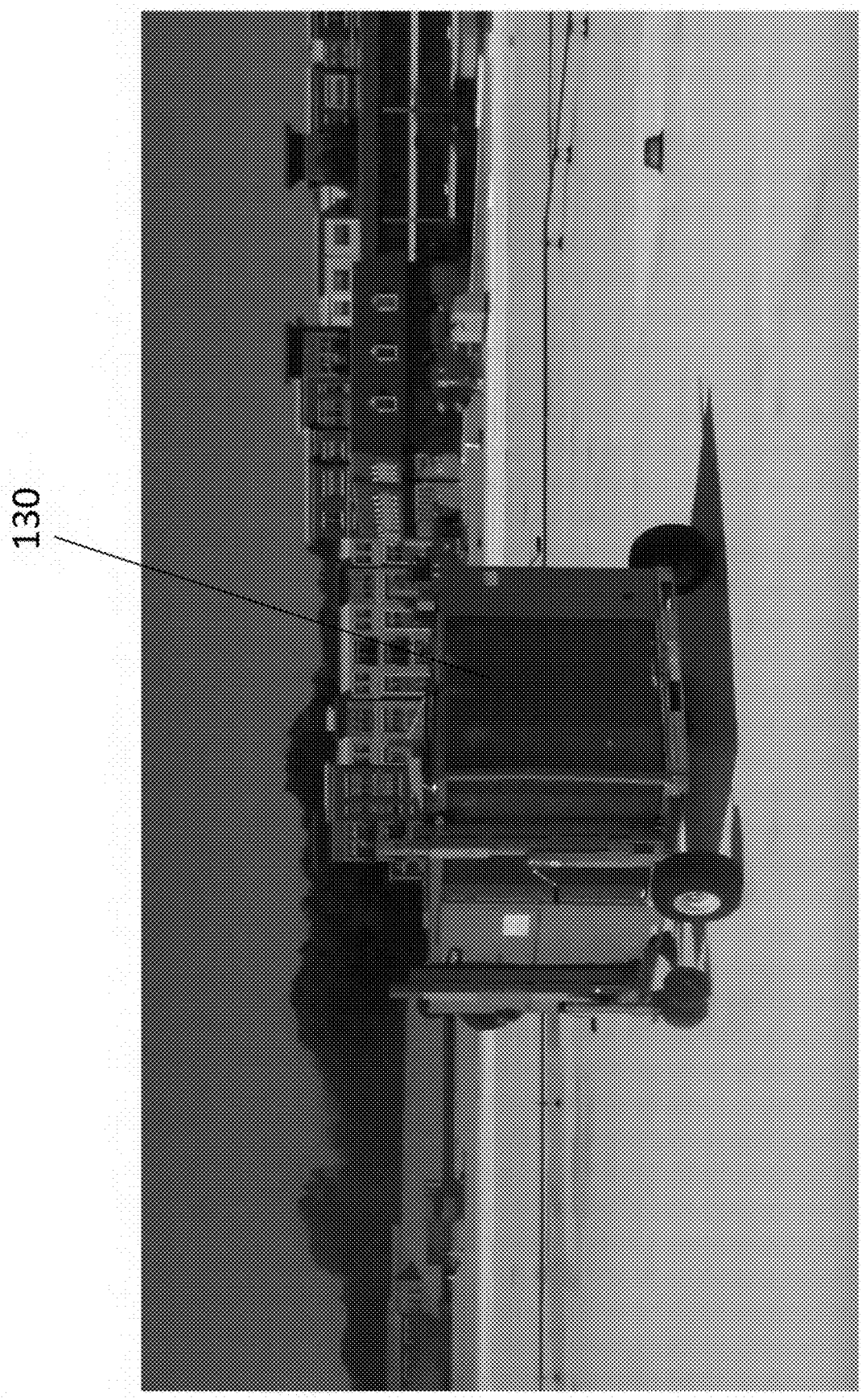
FIG. 22 is a Photostat showing another view of the example object to be transported of FIG. 21, the object being wheeled and turned, in accordance with aspects of the present disclosure.

FIG. 21 is a Photostat showing the example object to be transported 130 with a pair of upright inner sleeves 15 engaged with a first pair of fixed upright portions 9 each having attached fixed position wheels 3, and a second pair of fixed upright portions 9 engaged with pair of upright inner sleeves 25 with attached jacks 11 and attached directional wheels 27, in accordance with aspects of the present disclosure. FIG. 22 is a Photostat showing another view of the example object to be transported 130 of FIG. 21, the object 130 in process of being wheeled about and turned, in accordance with aspects of the present disclosure.

Figure 23:
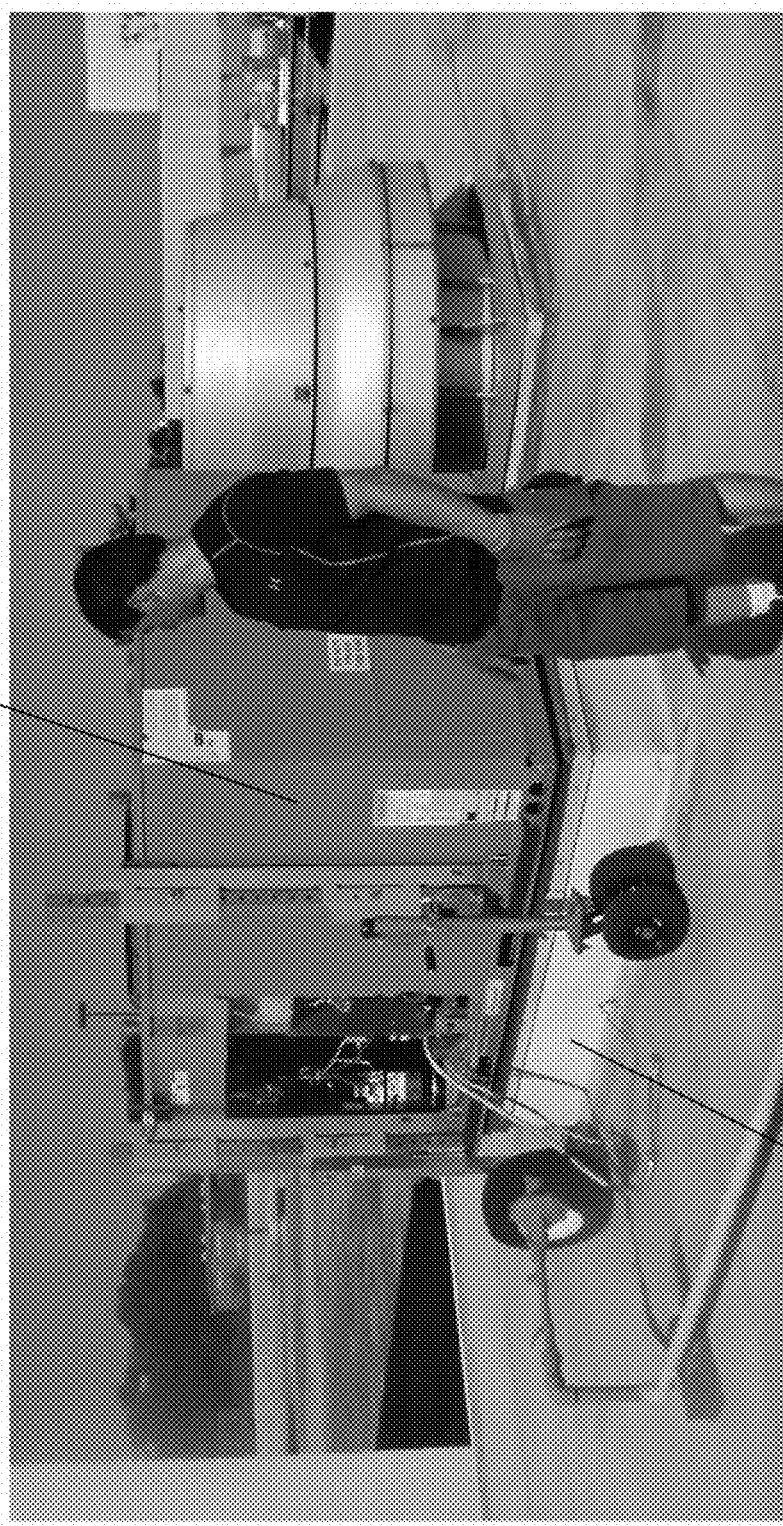
FIG. 23 is a Photostat showing the example object to be transported of FIGS. 21 and 22 in place after being transported for mounting on the mounting point/curb of FIG. 20, in accordance with aspects of the present disclosure.
Figure 24:
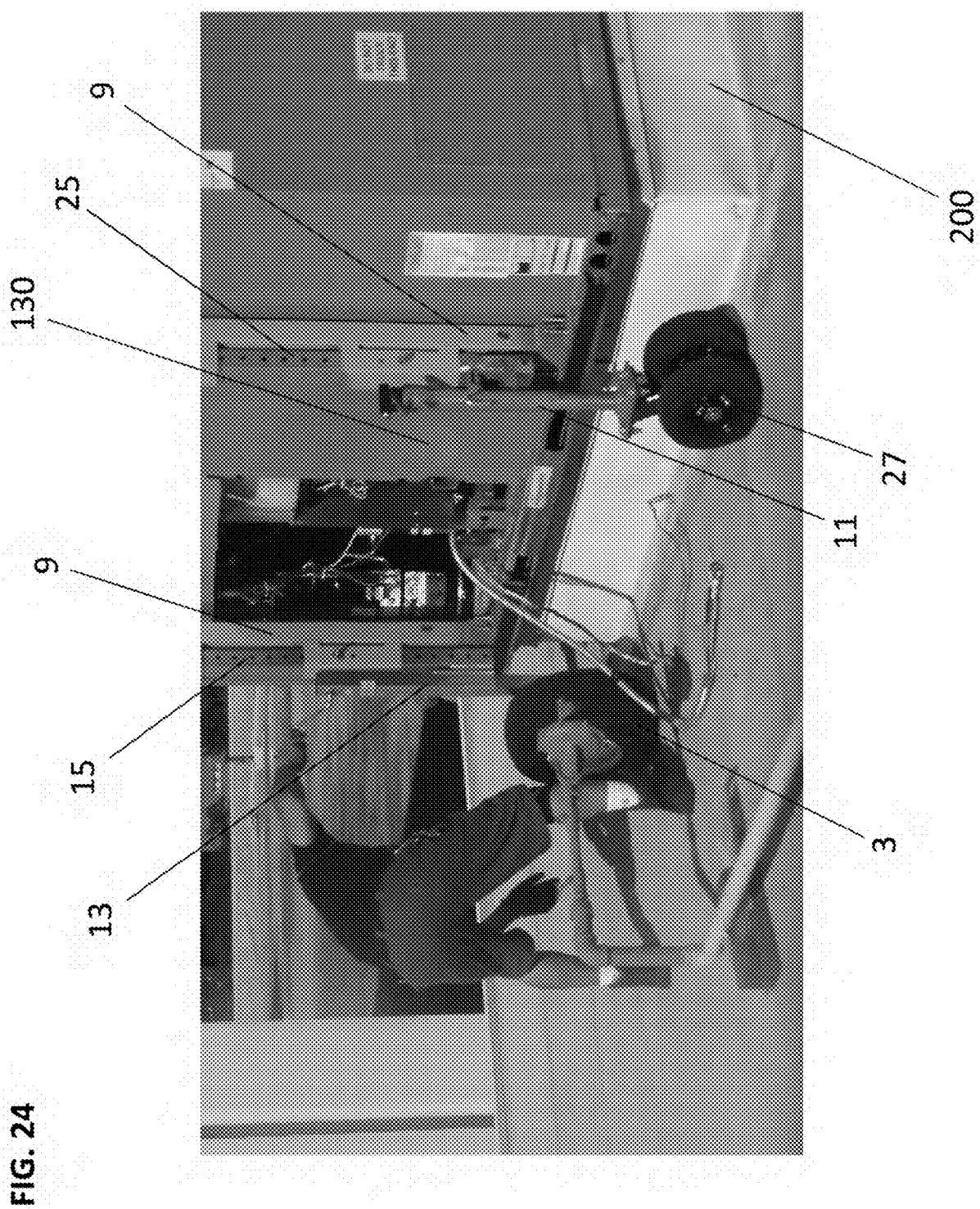
FIG. 24 is a Photostat showing the example object to be transported of FIG. 23 being lowered into mounting position on the mounting point/curb near one corner of the mounting point/curb, via a jack connected to the upright inner sleeve, in turn engaged with the example fixed upright portion, which is attached to the object to be transported, in accordance with aspects of the present disclosure.

FIG. 23 is a Photostat showing the example object to be transported 130 of FIGS. 21 and 22 located for emplacement on a mounting point/curb 200 of FIG. 20, after being transported thereto, in accordance with aspects of the present disclosure. FIG. 24 is a Photostat showing the example object to be transported 130 of FIG. 23 being lowered into mounting position on the mounting point/curb 200 near one corner of the mounting point/curb 200, via a jack 13 connected to the upright inner sleeve 15. The sleeve 15 in turn is engaged with the example fixed upright portion 9, which is attached to the object to be transported 130, in accordance with aspects of the present disclosure.

Figure 25:
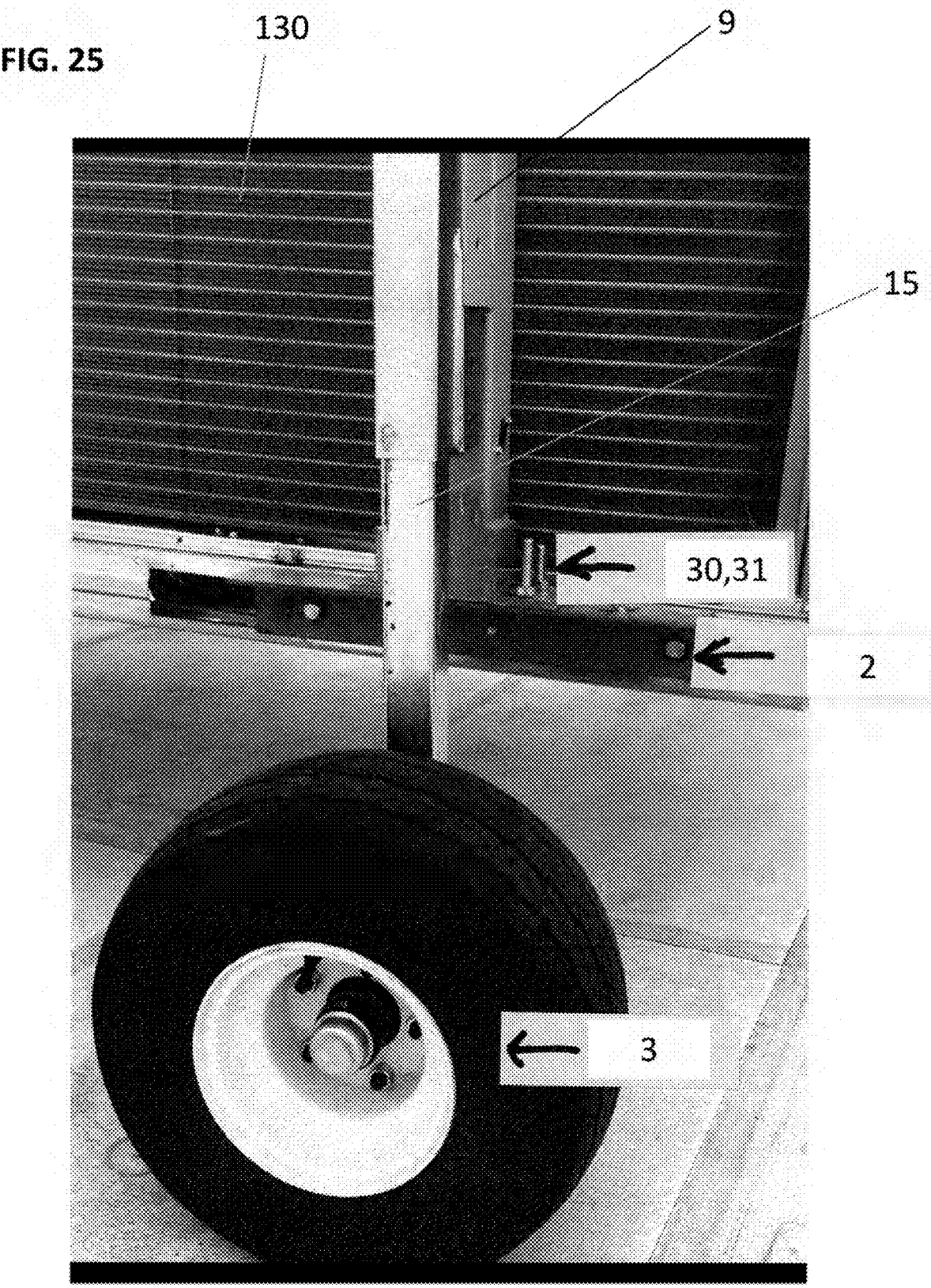
FIG. 25 is a Photostat of an upright inner sleeve with attached fixed position wheel, attached via a fixed upright to mounting plate, which in turn is attached to an object to be transported, in accordance with aspects of the present disclosure.

FIG. 25 is a Photostat of an upright inner sleeve 15 with attached fixed position wheel 3, attached via a fixed upright portion 9 to mounting plate 2. The mounting plate 2, in turn, is attached to an object to be transported 130, in accordance with aspects of the present disclosure.

Figure 26:
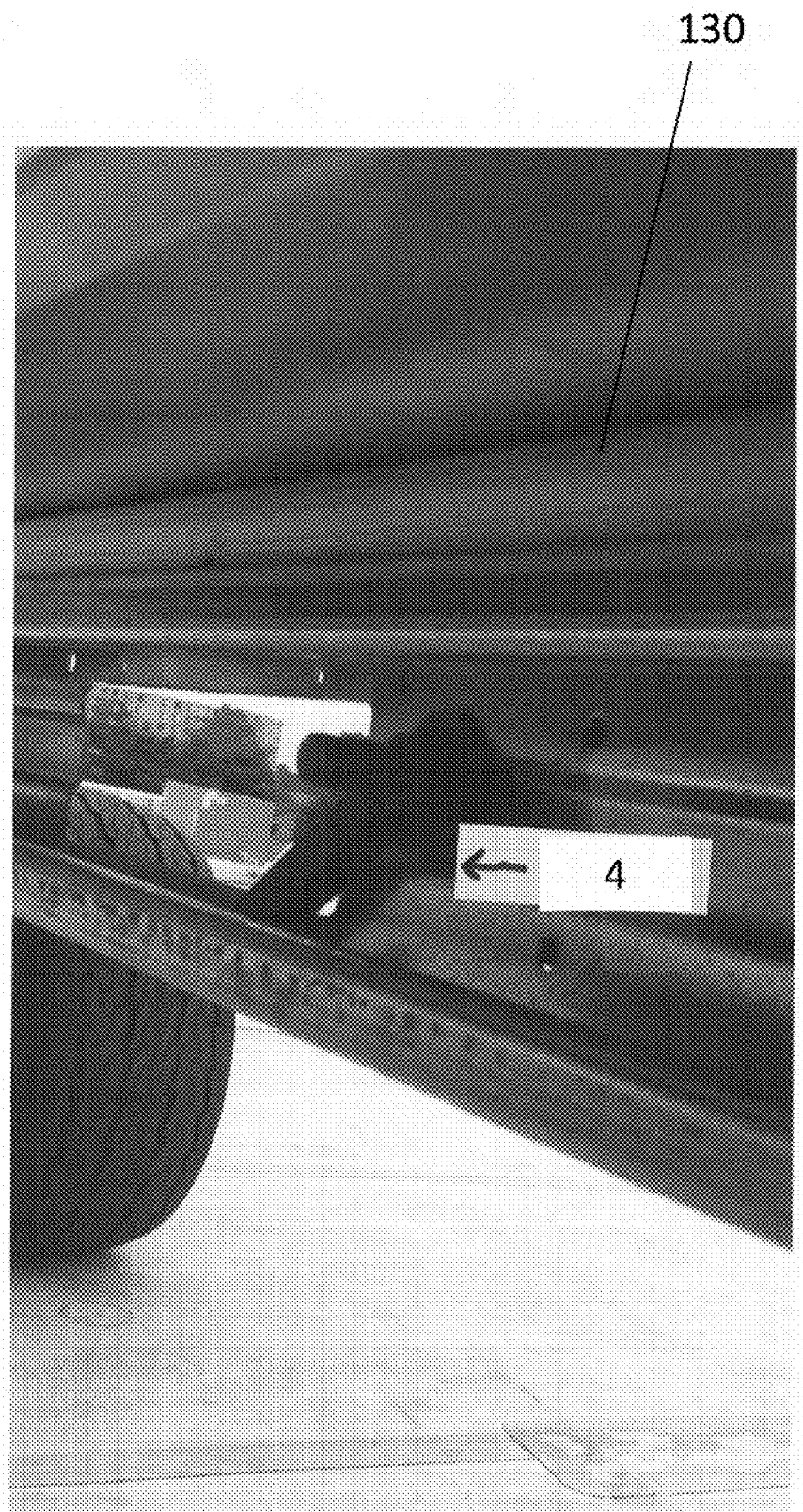
FIG. 26 is a Photostat showing an example mounting tab for use with the upright inner sleeve with engaged fixed upright and attached fixed position wheel of FIG. 25, for use with an example object to be transported 130, in accordance with aspects of the present disclosure.

FIG. 26 is a Photostat showing an example mounting tab 4 for use with the upright inner sleeve 15 with engaged fixed upright portion 9 and attached fixed position wheel 3 of FIG. 25, for use with an example object to be transported 130, in accordance with aspects of the present disclosure.

Figure 27:
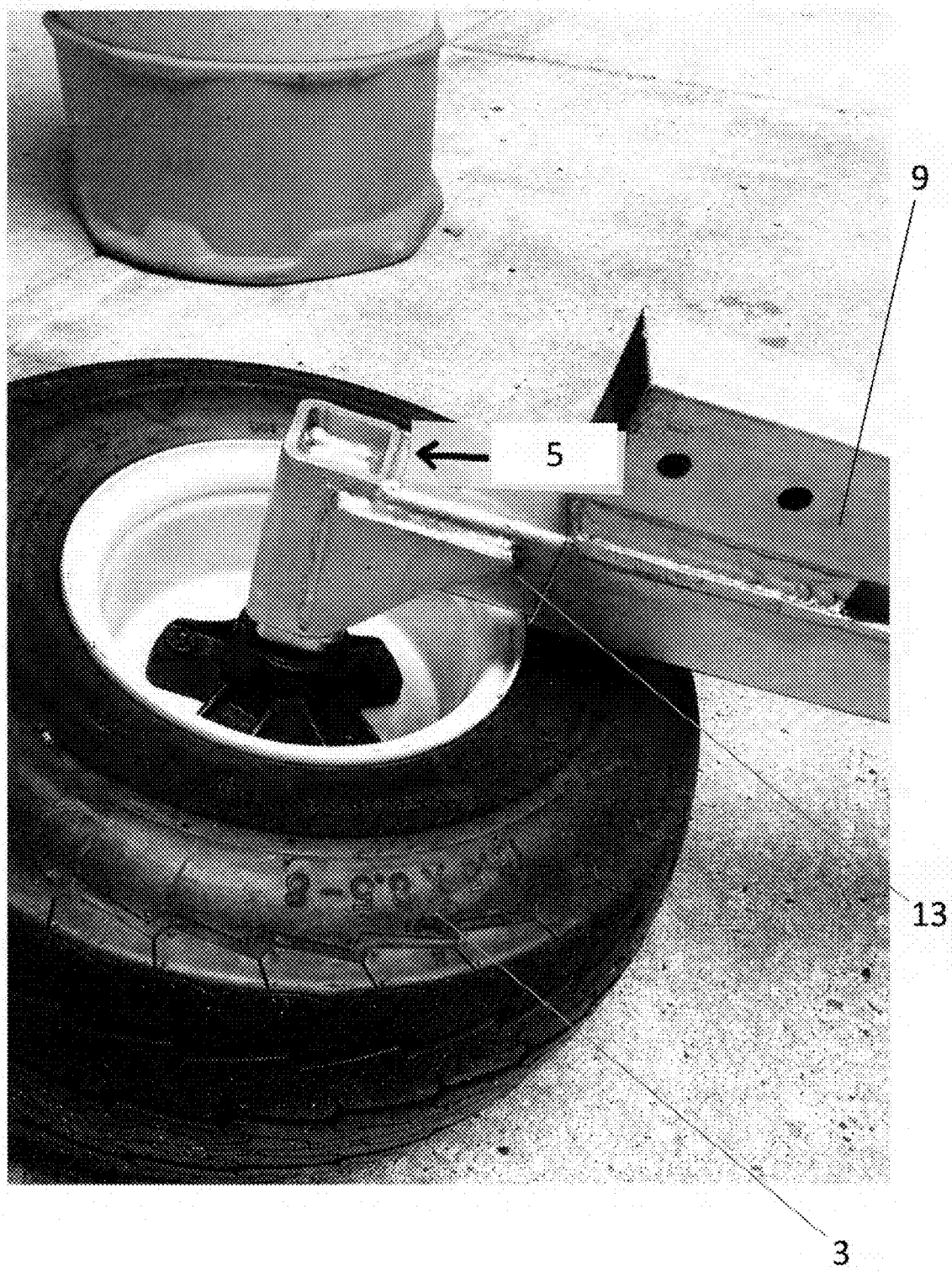
FIG. 27 is a Photostat showing an up close view of an attachment point for wheel, such as a spindle welded to the bottom of the jack, in turn engaged with an example fixed upright portion, in accordance with aspects of the present disclosure.

FIG. 27 is a Photostat showing an up close view of an attachment point 5 for wheel 3, the attachment point 5 comprising, for example, a spindle welded to the bottom of the jack 13, the jack 13 in turn being engaged with an example fixed upright portion 9, in accordance with aspects of the present disclosure.

Figure 28:
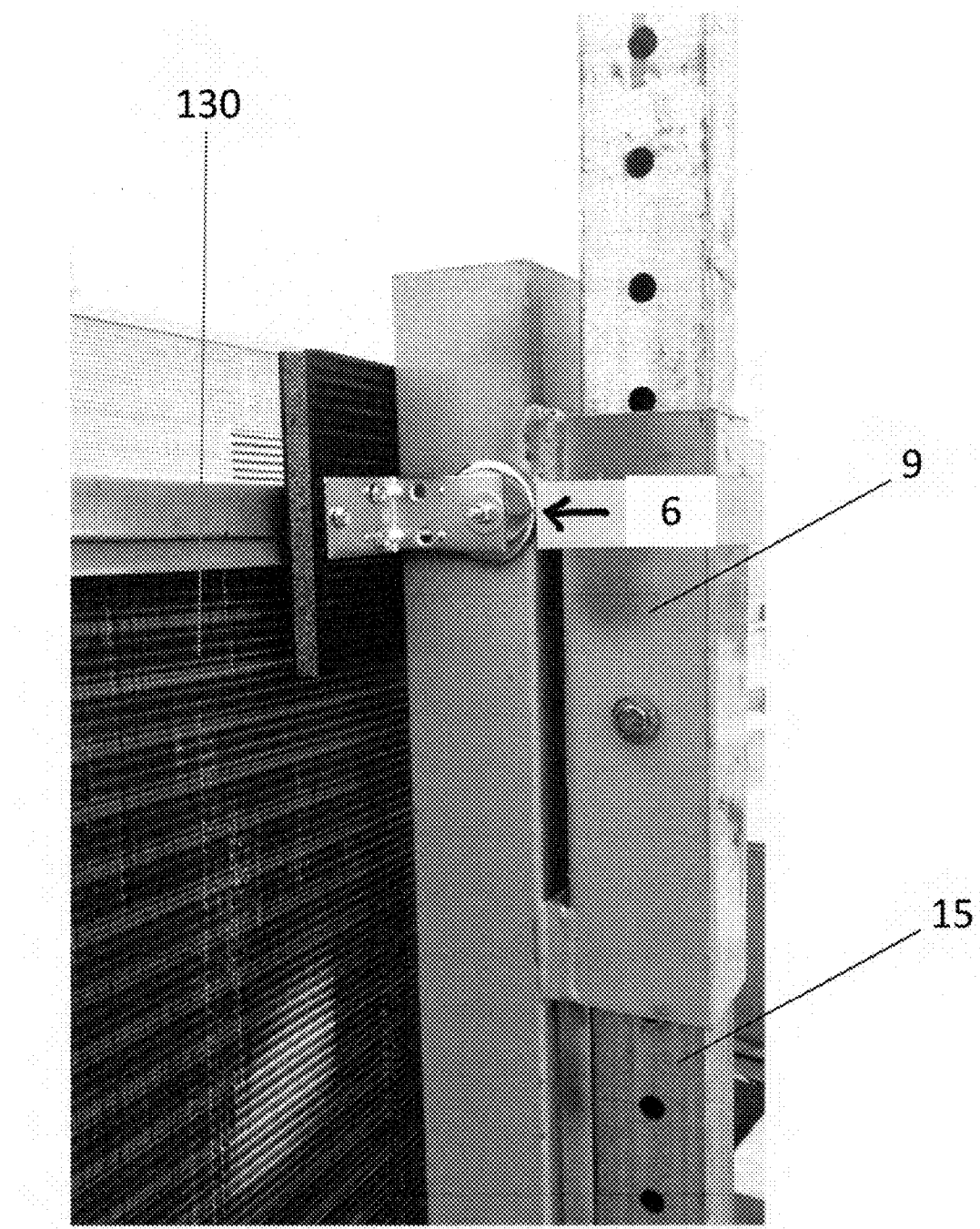
FIG. 28 is a Photostat showing a close up view of an example upright inner sleeve and engaged fixed upright portion, with cushioning bracket in place for contact with the example object to be transported, in accordance with aspects of the present disclosure.

FIG. 28 is a Photostat showing a close up view of an example upright inner sleeve 15 and engaged fixed upright portion 9, with cushioning bracket 6 in place for contact with the example object to be transported 130, in accordance with aspects of the present disclosure.

Figure 29:
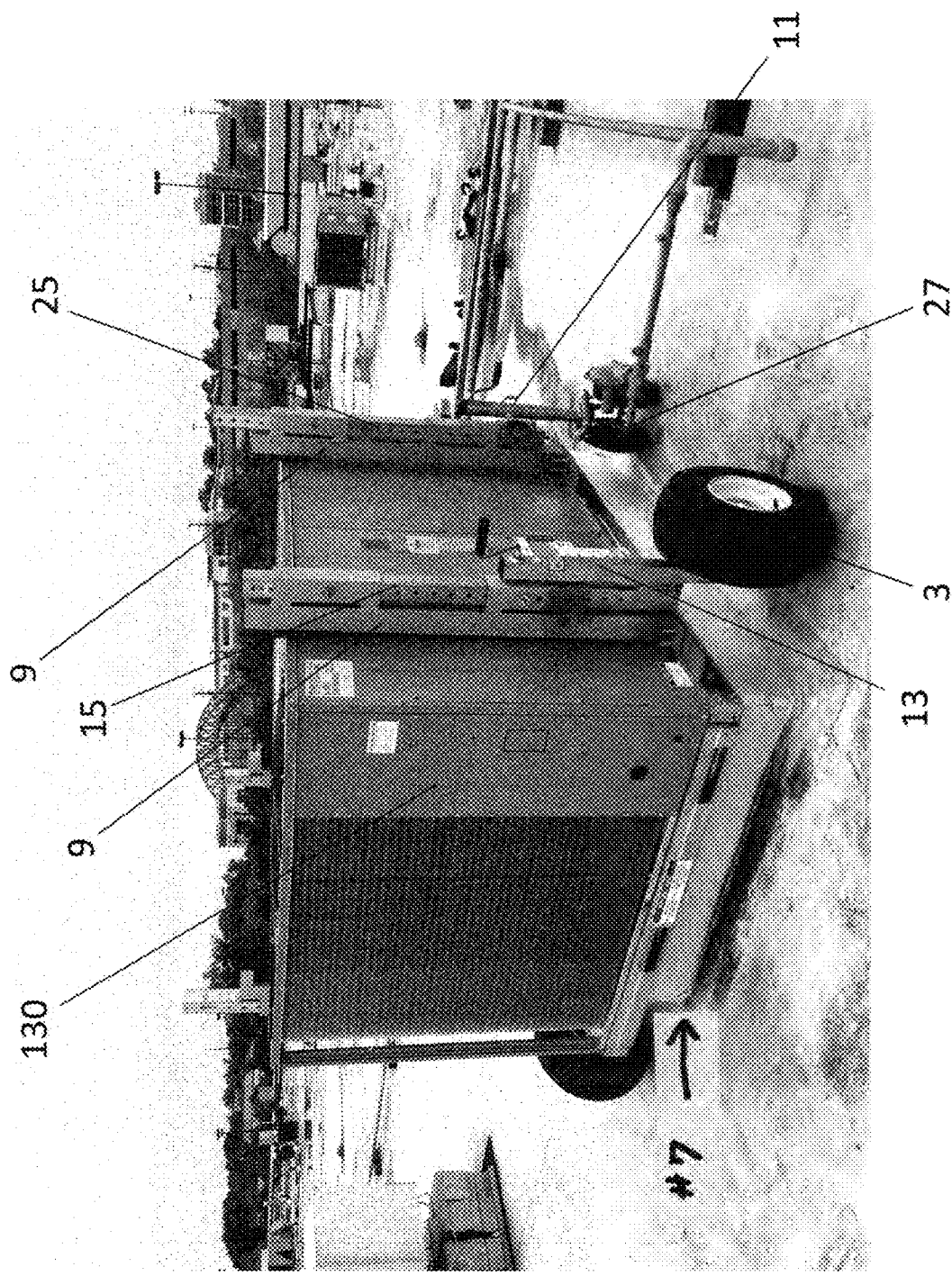
FIG. 29 is a Photostat showing another view of an example object to be transported with a pair of upright inner sleeves engaged with a first pair of fixed upright portions with attached jacks and fixed position wheels, and a second pair of fixed upright portions engaged with pair of upright inner sleeves with attached jacks and directional wheels, in accordance with aspects of the present disclosure.

FIG. 29 is a Photostat showing another view of an example object to be transported 130 with a pair of upright inner sleeves 15 engaged with a first pair of fixed upright portions 9 with attached jacks 13 and fixed position wheels 3, along with a second pair of fixed upright portions 9 engaged with pair of upright inner sleeves 25 with attached jacks 11 and directional wheels 27, in accordance with aspects of the present disclosure.

Figure 30:
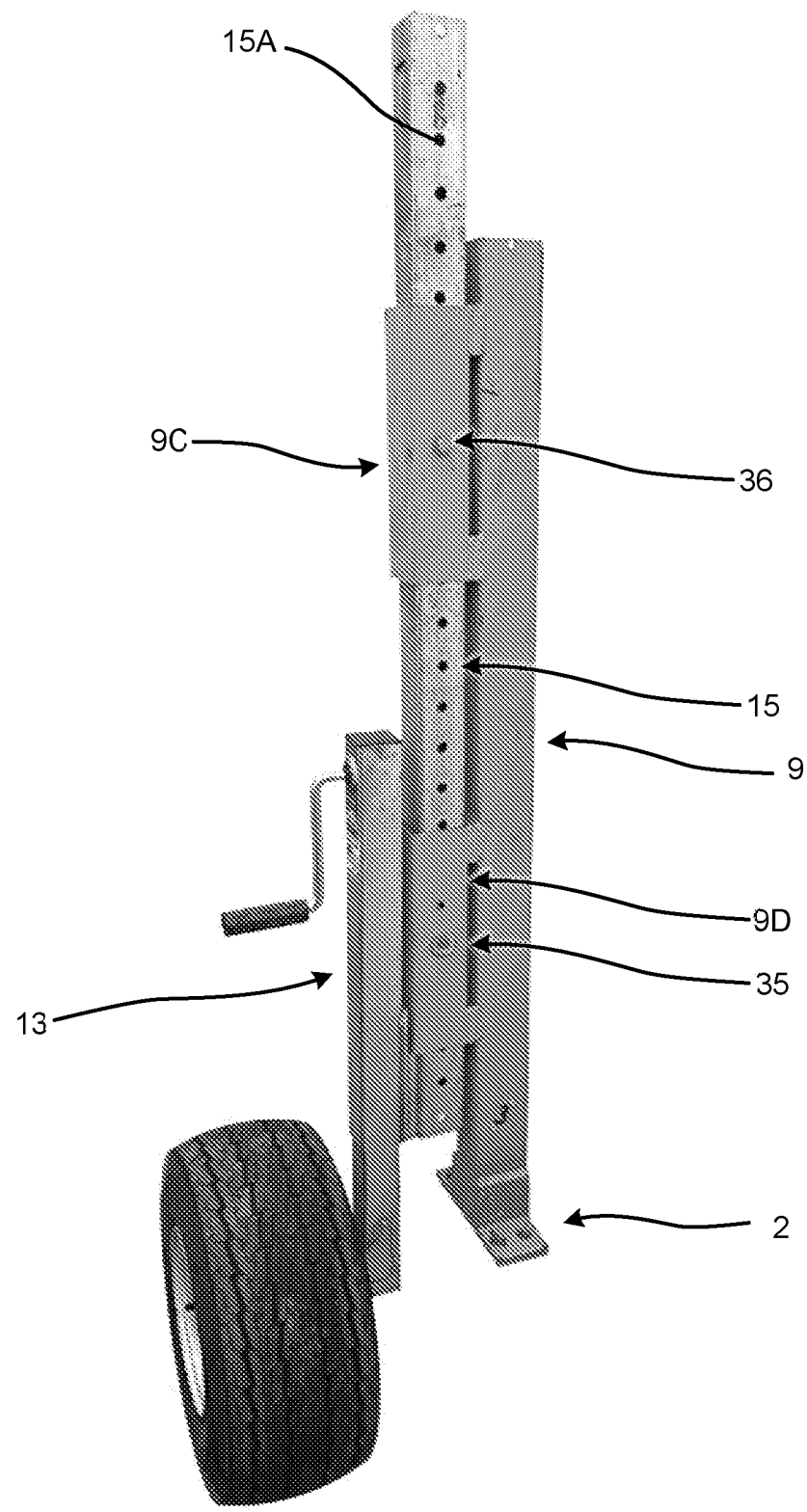
FIG. 30 is a Photostat showing a fully assembled example upright inner sleeve with height adjustment openings, the upright inner sleeve being engaged with a fixed upright portion via with attached jack and fixed position wheel, in accordance with aspects of the present disclosure.

FIG. 30 is a Photostat showing a fully assembled example upright inner sleeve 15 with height adjustment openings 15a, the upright inner sleeve 15 being engaged with a fixed upright portion 9 having attached jack 11 and fixed position wheel 3, in accordance with aspects of the present disclosure.

Figure 31:
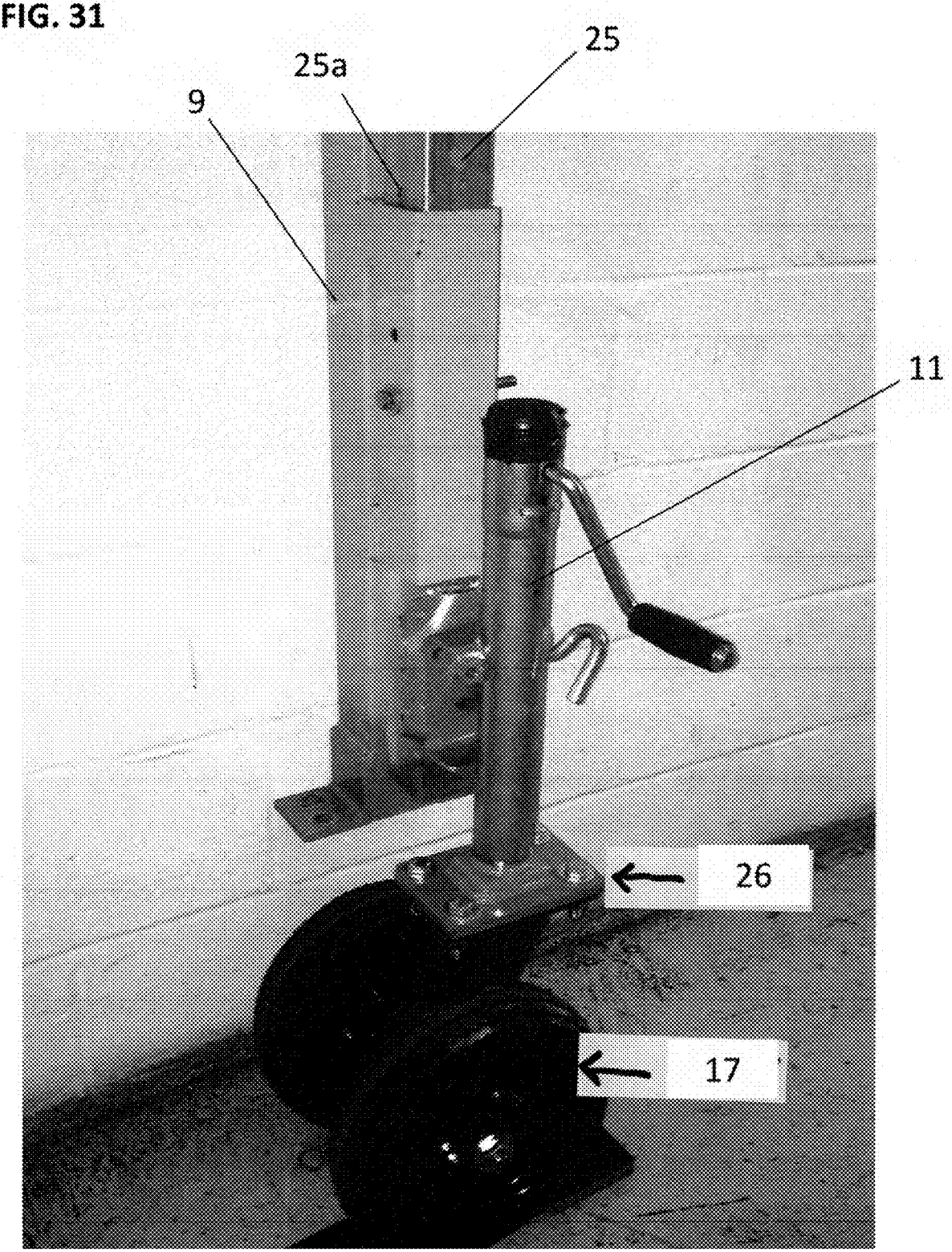
FIG. 31 is a Photostat showing a close up view of a fully assembled example upright inner sleeve with height adjustment openings, fixed upright engaged with example upright inner sleeve, and an attached jack with directional wheel mounted via caster, in accordance with aspects of the present disclosure.

FIG. 31 is a Photostat showing a close up view of a fully assembled example upright inner sleeve 25 with height adjustment openings 25a, engaged with a fixed upright portion 9, the example upright inner sleeve 25 having an attached jack 11 with directional wheel 27 mounted via castor 26 thereto, in accordance with aspects of the present disclosure.

Figure 32:
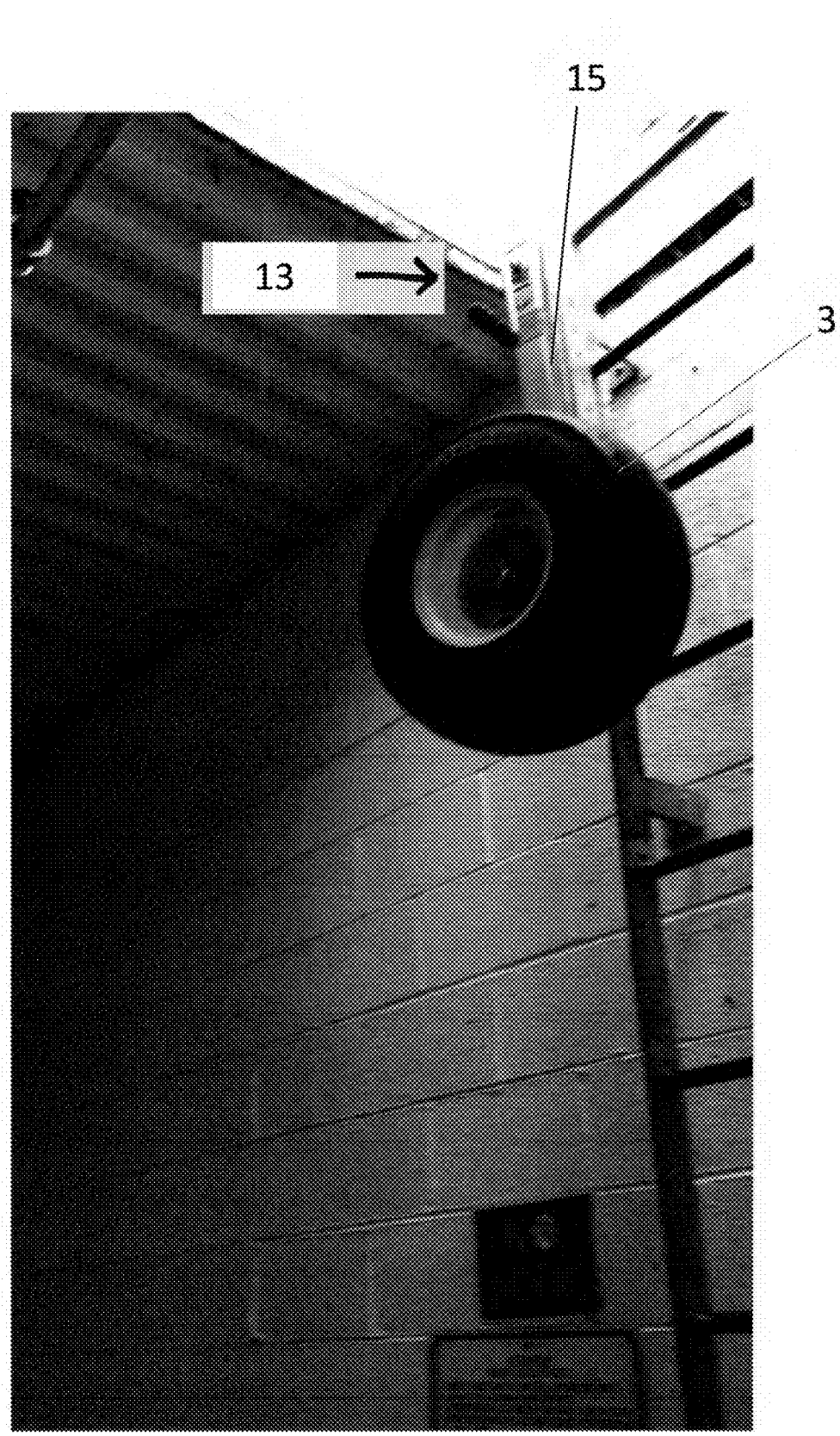
FIG. 32 shows the fully assembled example upright inner sleeve, the upright inner, attached jack, and wheel of FIG. 30 being lifted through a relatively small roof opening, in accordance with aspects of the present disclosure.

FIG. 32 shows an example upright inner sleeve 15 and attached jack 13 and wheel 3 being lifted through a relatively small roof opening, in accordance with aspects of the present disclosure. The unassembled portions of the system may be brought through a typical roof hatch for a building. The parts may be hoisted, for example, through a rooftop hatch using a rope or the like (e.g., a ½" diameter rope). In some variations, the portions of the device or system may each be able to fit though any roof hatch having an opening of about one square foot or greater.

In use, after the parts are hoisted to the rooftop (FIG. 32) and initial parts assembly is completed, as shown in FIGS. 2-5 and 9-12, and a plurality of plates 2 are bolted to the rail of the rooftop air conditioner (FIG. 13). Four plates 2 may be used, for example, with one plate 2 being placed at each corner of the object to be transported (e.g., object 130 as shown, for example, in FIG. 22). The plate 2 may be attached to the object to be transported via a mounting tab 4 (see, e.g., FIG. 26). Only a single wrench or socket (e.g., ⅝" wrench or socket) may be needed in order to bolt the system in place, since the mounting tab 4 may be prevented from turning via the rail, thereby allowing a nut to be tightened without the mounting tab 4 spinning. A cushioning bracket 6 may also be used, e.g., via a magnet attached to an angle bracket with a flexible pad (e.g., cork or rubber) to cushion each fixed upright 9 when contacting the object to be transported, so as not to damage the unit (FIGS. 17-19).

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of the processes/flowcharts disclosed is an illustration of example approaches. Based upon design preferences, it is understood that the specific order or hierarchy in the processes/flowcharts may be rearranged. Further, some features/steps may be combined or omitted. The accompanying method claims present elements of the various features/steps in a sample order, and are not meant to be limited to the specific order or hierarchy presented.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

KEY

2 Mounting plate
2a First extending body portion
2b Second extending body portion
3 Fixed position wheel
4 Securing tab
5 Spindle for attachment to lower end of jack
6 Cushioning bracket
9 Fixed upright portion
9a End flange portion
9c Hole or opening
9d Sleeve portion
9e Sleeve portion
11 Jack for directional wheel
13 Jack for fixed wheel
15 Upright inner sleeve for fixed wheel
15a Height adjustment holes or opening
20 Roof hatch
25 Upright inner sleeve for directional wheel
25a Height adjustment holes or openings
26 Caster
27 Directional wheel
30 Bolt
31 Nut
35 Pin
36 Pin
130 Object to be transported
200 Mounting point/curb

The invention claimed is:

1. A system for rooftop transport of a heating venting, and air conditioning (HVAC) unit, the system comprising:
 a first wheeled attachment feature for removably connecting to the HVAC unit, wherein the first wheeled attachment feature includes:
  a first selectively variable height mechanism connected to a first inner sleeve;
  a first upright portion for connecting the first inner sleeve at a plurality of selectable positions relative to the first upright portion, such that an overall height of the first upright portion and the first inner sleeve may be selectably varied;
  a first securing mechanism at a first end of the first upright portion for securing the first wheeled attachment feature to the HVAC unit; and
  a first wheel, wherein the first wheel is a directional wheel;
 a second wheeled attachment feature, that is separately portable with respect to the first wheeled attachment feature and is for removably connecting to the HVAC unit, wherein the second wheeled attachment feature includes:
  a second selectively variable height mechanism connected to a second inner sleeve;
  a second upright portion for connecting the second inner sleeve at a plurality of selectable positions relative to the second upright portion, such that an overall height of the second upright portion and the second Inner sleeve may be selectably varied;
  a second securing mechanism at a first end of the second upright portion for securing the second wheeled attachment feature to the HVAC unit; and
  a second wheel;
 a third wheeled attachment feature that is separately portable with respect to the first wheeled attachment feature and the second wheeled attachment feature and is for removably connecting to the HVAC unit, wherein the third wheeled attachment feature includes:
  a third selectively variable height mechanism connected to a third inner sleeve;
  a third upright portion for connecting the third inner sleeve at a plurality of selectable positions relative to the third upright portion, such that an overall height of the third upright portion and the third inner sleeve may be selectably varied;
  a third securing mechanism at a first end of the third upright portion and for securing the third wheeled attachment feature to the HVAC unit; and
  a third wheel; and
 a fourth wheeled attachment feature that is separately portable with respect to the first wheeled attachment feature, second wheeled attachment feature, and third wheeled attachment feature and is for removably connecting to the HVAC unit, wherein the fourth wheeled attachment feature includes:
  a fourth selectively variable height mechanism connected to a fourth inner sleeve;
  a fourth upright portion for connecting the fourth inner sleeve at a plurality of selectable positions relative to the fourth upright portion, such that an overall height of the fourth upright portion and the fourth Inner sleeve may be selectably varied;

a fourth securing mechanism at a first end of the third upright portion and for securing the fourth wheeled attachment feature to the HVAC; and
a fourth wheel.

2. The system of claim 1, wherein the first securing mechanism, second securing mechanism and third securing mechanism further comprise:
at least one mounting plate, the at least one mounting plate being attachable to the HVAC unit and a respective one of the first upright portion, second upright portion, or third upright portion.

3. The system of claim 2, further comprising:
at least one mounting tab;
wherein the mounting plate is attachable to the HVAC unit via one of the at least one mounting tab.

4. The system of claim 1, wherein the first wheel has an axis of rotation and is directable via rotation about a steering axis having a direction perpendicular to the axis of rotation.

5. The system of claim 1, further comprising:
a cushioning bracket for placing between the first upright portion and the HVAC unit near a second end of the first upright portion.

6. The system of claim 1, wherein the first selectively variable height mechanism is a jack.

7. The system of claim 4, wherein the directional wheel of the first wheel is a caster.

8. The system of claim 1, wherein a distance between the first securing mechanism and the axis of rotation of the first wheel is adjustable via the variable securing of the first inner sleeve to the first upright portion.

9. The system of claim 8, wherein the first inner sleeve further comprises a first series of though-holes, and the first upright portion comprises a second plurality of through-holes, wherein the distance between the first securing mechanism and the axis of the rotation of the first wheel is adjustable by passing a pin or bolt though a first one of the first series of through-holes and a first one of the second series of through-holes.

10. A system for rooftop transport of a heating, venting, and air conditioning (HVAC) unit, the system comprising:
a first wheeled attachment feature, for removably connecting to the HVAC unit, wherein the first wheeled attachment feature includes:
a first selectively variable height mechanism connected to a first inner sleeve;
a first upright portion for connecting to the first inner sleeve;
a first securing mechanism at a first end of the first wheeled attachment feature for securing the first wheeled attachment feature to the HVAC unit, wherein the first securing mechanism comprises a first bracket that connects to a first opening in the frame rail of the HVAC unit by placing a first threaded tab within a frame rail of the HVAC unit and passing a first bolt though the first bracket and the first opening in the frame rail and threading the first bolt into the first threaded tab, wherein the first threaded tab contacts a portion of the frame rail and is limited from turning within the frame rail during tightening of the first bolt; and
a first wheel, wherein the first wheel is a directional wheel;
a second wheeled attachment feature, that is separately portable with respect to the first wheeled attachment feature and is for removably connecting to the HVAC unit, wherein the second wheeled attachment feature includes:
a second selectively variable height mechanism connected to a second inner sleeve;
a second upright portion for connecting to the second inner sleeve;
a second securing mechanism at a first end of the second wheeled attachment feature for securing the second wheeled attachment feature to a second opening in the frame rail of the HVAC unit, wherein the second securing mechanism comprises a first bracket that connects to the HVAC unit by placing a threaded tab within a frame rail of the HVAC unit and passing a bolt though the second bracket and the second opening in the frame rail and threading the bolt into the threaded tab, wherein the second threaded tab contacts a portion of the frame rail and is limited from turning within the frame rail during tightening of the second bolt; and
a second wheel; and
a third wheeled attachment feature that is separately portable with respect to the first wheeled attachment feature and the second wheeled attachment feature and is for removably connecting to the HVAC unit, wherein the third wheeled attachment feature includes:
a third selectively variable height mechanism connected to a third inner sleeve;
a third upright portion for securing to the third inner sleeve;
a third securing mechanism at a first end of the third wheeled attachment feature for securing the third wheeled attachment feature to a third opening in the frame rail of the HVAC unit, wherein the third securing mechanism comprises a third bracket that connects to the HVAC unit by placing a third threaded tab within a frame rail of the HVAC unit and passing a third bolt though the third bracket and the third opening in the frame rail and threading the third bolt into the third threaded tab, wherein the third threaded tab contacts a portion of the frame rail and is limited from turning within the frame rail during tightening of the third bolt; and
a third wheel;
a fourth wheeled attachment feature that is separately portable with respect to the first wheeled attachment feature, second wheeled attachment feature, and third wheeled attachment feature and is for removably connecting to the HVAC unit, wherein the fourth wheeled attachment feature includes:
a fourth selectively variable height mechanism connected to a fourth inner sleeve;
a fourth upright portion for securing to the fourth inner sleeve;
a fourth securing mechanism at a first end of the fourth wheeled attachment feature for securing the fourth wheeled attachment feature to a fourth opening in the frame rail of the HVAC unit, wherein the fourth securing mechanism comprises a fourth bracket that connects to the HVAC unit by placing a fourth threaded tab within a frame rail of the HVAC unit and passing a fourth bolt though the fourth bracket and the fourth opening in the frame rail and threading the fourth bolt into the fourth threaded tab, wherein the fourth threaded tab contacts a portion of the frame rail and is limited from turning within the frame rail during tightening of the fourth bolt; and
a fourth wheel.

* * * * *